US011982111B2

(12) United States Patent
Horn

(10) Patent No.: US 11,982,111 B2
(45) Date of Patent: May 14, 2024

(54) LATCH ASSEMBLY

(71) Applicant: Bright Spark Product Development Pty Ltd, Forrestdale (AU)

(72) Inventor: Dirk Horn, Forrestdale (AU)

(73) Assignee: Bright Spark Product Development Pty Ltd, Forrestdale (AU)

(*) Notice: Subject to any disclaimer, the term of this patent is extended or adjusted under 35 U.S.C. 154(b) by 905 days.

(21) Appl. No.: 16/618,433

(22) PCT Filed: May 30, 2018

(86) PCT No.: PCT/AU2018/050522
§ 371 (c)(1),
(2) Date: Dec. 2, 2019

(87) PCT Pub. No.: WO2018/218288
PCT Pub. Date: Dec. 6, 2018

(65) Prior Publication Data

US 2020/0232261 A1 Jul. 23, 2020

(30) Foreign Application Priority Data

May 30, 2017 (AU) ................................ 2017902050

(51) Int. Cl.
*E05B 81/02* (2014.01)
*E05B 17/00* (2006.01)
(Continued)

(52) U.S. Cl.
CPC .......... *E05B 81/02* (2013.01); *E05B 17/0025* (2013.01); *E05B 83/01* (2013.01); *E05C 9/08* (2013.01)

(58) Field of Classification Search
CPC .......... E05B 83/01; E05B 85/20; E05B 85/24; E05B 85/243; E05B 85/247; E05B 85/26; E05B 79/14; E05B 17/10025; E05C 3/16; E05C 3/162; E05C 3/22; E05C 3/24; E05C 3/26; E05C 3/30; E05C 9/00; E05C 9/002; E05C 9/008; E05C 9/04; E05C 9/043; E05C 9/048; E05C 9/08; E05C 9/10; E05C 9/16; E05C 9/1825; E05C 9/1875; E05C 9/1891; E05C 9/24; Y10T 292/0825;
(Continued)

(56) References Cited

U.S. PATENT DOCUMENTS 1,744,424 A * 1/1930 Trudeau .................... E05C 3/24
70/DIG. 52
4,230,351 A * 10/1980 Bisbing ..................... E05C 3/08
292/DIG. 49
(Continued)

*Primary Examiner* — Christine M Mills
*Assistant Examiner* — Yahya Sidky
(74) *Attorney, Agent, or Firm* — patenttm.us

(57) ABSTRACT

A latching mechanism for securing a door mounted to a door frame comprises a striker pin mounted to the door frame; a pawl comprising a first arm for holding the striker pin captive when the pawl is in a latching position; and an actuator moveable relative to the door for opening or closing the door. The actuator is configured to pivot the pawl from the latching position to an open position according to movement of the actuator. The actuator comprises a biasing mechanism for urging the pawl to remain in the latching position until a resistance of the biasing mechanism is overcome by operation of the actuator.

36 Claims, 28 Drawing Sheets

(51) Int. Cl.
*E05B 83/00* (2014.01)
*E05C 9/08* (2006.01)

(58) Field of Classification Search
CPC ......... Y10T 292/0826; Y10T 292/0828; Y10T 292/0832; Y10T 292/0848; Y10T 292/0849; Y10T 292/0853; Y10T 292/0859
See application file for complete search history.

(56) References Cited

U.S. PATENT DOCUMENTS 4,659,884 A * 4/1987 Wollenhaupt ........ H01H 27/007
200/50.01
6,327,879 B1 12/2001 Malsom

* cited by examiner

LATCH ASSEMBLY

FIELD OF THE INVENTION

The present invention relates to a latch for latching a door closed. The invention finds application particularly, but not exclusively, in shell doors, such as those used in military vehicles, security vehicles, sea-going vessels and aircraft.

BACKGROUND

Shell doors, such as those used on military vehicles and sea-going vessels, are heavy in weight, and have significant door seals to prevent pressurised air or water from crossing from one side of the door to the other. Such doors swing on hinges from an open position to a closed position where it abuts a door frame. When closed, it is desired to keep such a door closed by a latching mechanism that is easy to use, but also assists the user in overcoming the yield resistance of the door seal. During closing, the latch has to be in an unlatched position so as not to interfere with the frame during the last stages of closing of the door.

The present invention has been developed to address this problem.

SUMMARY OF THE INVENTION

According to an aspect of the present invention there is provided a latching mechanism for securing a door mounted to a door frame, the latching mechanism comprising:

- a striker pin mounted to the door frame;
- a pawl comprising a first arm for holding the striker pin captive when the pawl is in a latching position;
- an actuator moveable relative to the door for opening or closing the door, the actuator being configured to pivot the pawl from the latching position to an open position according to movement of the actuator,
- wherein the actuator comprises a biasing mechanism for urging the pawl to remain in the latching position until a resistance of the biasing mechanism is overcome by operation of the actuator.

According to an aspect of the present invention there is provided a latching mechanism for securing a door mounted to a door frame, the latching mechanism comprising:

- a striker pin mounted to the door frame;
- a pawl comprising a first arm for holding the striker pin captive when the pawl is in a latching position;
- an actuator moveable relative to the door for opening or closing the door, the actuator being configured to pivot the pawl from the latching position to an open position according to movement of the actuator,
- wherein the actuator comprises a biasing mechanism for urging the pawl to remain in the open position until the door is closed such that the striker pin contacts and moves a component of the biasing mechanism, or the pawl, so as to overcome a resistance of the biasing mechanism by operation of the actuator.

In an embodiment, the actuator is configured such that operation of the actuator so as to overcome the resistance is required/occurs before the actuator is operated to open the door. The actuator is configured such that operation of the actuator so as to overcome the resistance is required/occurs before the pawl may unlatch the striker pin. The actuator is configured such that operation of the actuator to unlatch the pawl occurs before further operation of the actuator opens the door.

In an embodiment the actuator comprises a linkage mechanism comprising at least a first and a second link member which are pivotally coupled to each other by a second floating pivot. In an embodiment the first link member is pivotally coupled to the pawl by a first floating pivot. In an embodiment the second link member is pivotally coupled at a point fixed relative to the door. In an embodiment operation of the actuator causes the second link member to pivot relative to the point fixed relative to the door.

In an embodiment when the second floating pivot, the point fixed relative to the door and the first floating pivot are not aligned and the pawl is positioned to be between the open position and the latched position, the linkage mechanism is in a before-centre arrangement.

In an embodiment the linkage mechanism is arranged so that to move the pawl to the latched position the second floating pivot, the point fixed relative to the door and the first floating pivot must move to and then past alignment to an over centre position, such that a force on the pawl attempting to move the pawl from the latched position is transferred through the linkage mechanism so that the second floating pivot attempts to move further out of alignment. In an embodiment the latching mechanism comprises a stop for stopping the second linkage member from moving the second floating pivot further out of alignment.

In an embodiment the linkage mechanism is arranged so that to move the pawl to the opened position the second floating pivot, the first floating pivot and the fixed pivot of the pawl must move to and then past alignment to an over centre position, such that a force on the pawl attempting to move the pawl from the opened position is transferred through the linkage mechanism so that the second floating pivot attempts to move further out of alignment. In an embodiment the latching mechanism comprises a stop for stopping the second linkage member from moving the second floating pivot further out of alignment.

In an embodiment the pawl or first linkage comprises a protrusion which is configured so that when the pawl moves to release the striker pin, the protrusion ejects the striker pin from being captive.

In an embodiment the actuator comprises a handle which is configured so that when the handle is operated to open the door the pawl is moved so as to release the striker pin.

In an embodiment the actuator comprises a handle which is configured so that when the handle is operated to close the door, the pawl is moved so as to capture the striker pin.

In an embodiment, the actuator is configured such that operation of the actuator so as to close the door is required/occurs before the operation of the actuator overcomes the resistance of the biasing mechanism.

In an embodiment the actuator is configured such that operation of the actuator so as to overcome the resistance is required/occurs before the pawl may latch the striker pin.

According to an aspect of the present invention there is provided a latching mechanism for securing a door mounted to a door frame, the latching mechanism comprising:

- a striker pin mounted to the door frame;
- a pawl comprising a first arm for holding the striker pin captive when the pawl is in a latching position;
- an actuator moveable relative to the door for opening or closing the door, the actuator being configured to pivot the pawl from the open position to a latching position according to movement of the actuator, wherein the actuator comprises a plurality of pivotable links arranged so as to apply a leveraged force to the pawl, wherein the pawl is able to be moved by the actuator so as to push against the strike pin so as to overcome resistance of a door seal when moving to the closed position.

In an embodiment the biasing mechanism comprises a spring. In an embodiment the biasing mechanism comprises a first over-centre mechanism. In an embodiment the first over-centre mechanism urges the actuator to keep the pawl in the latched position, whereby unlatching force applied to the pawl is arranged to urge the first over-centre mechanism further over-centre. In an embodiment unlatching movement of the actuator moves the first over-centre mechanism toward dead-centre and then past dead-centre. In an embodiment the biasing mechanism further comprises a stop for preventing the first over-centre mechanism from further movement over-centre.

In an embodiment the biasing mechanism comprises a second over-centre mechanism. In an embodiment the second over-centre mechanism urges the actuator to keep the pawl in the unlatched position, whereby a closing action applied to the actuator urges the pawl further in a unlatching direction. In an embodiment the biasing mechanism further comprises a stop for preventing the pawl from moving further in the unlatching direction. In an embodiment the stop is the second link member. In an embodiment the contact by the striker pin against the pawl or the first linkage moves the second over-centre mechanism toward and then past over-centre, such that a closing action applied to the actuator urges the pawl in the latching direction.

In an embodiment the actuator comprises a torque bar for rotating a first pivot of a second linkage about a second pivot. In an embodiment the range of movement of the second linkage is limited. In an embodiment the range of movement is limited by the second linkage reaching a stop.

In an embodiment the second pivot is fixed in position in relation to the door. In an embodiment the second linkage is connected to the pawl at a third pivot. In an embodiment pivoting of the pawl occurs around a pawl pivot which is fixed in position in relation to the door. In an embodiment the first linkage is pivotable in relation to the actuation pin.

In an embodiment the first oval-centre mechanism comprises an arrangement where there is an alignment of the first pivot, the second pivot and the third pivot before the actuator is at a first end of the permitted range of movement. In an embodiment the first over-centre mechanism comprises an arrangement where the first pivot moves past the alignment when the actuator torque bar is at the first end of the permitted range of movement.

In an embodiment the second over-centre mechanism comprises an arrangement where there is an alignment of the pawl pivot, the second pivot and the third pivot before the actuator is at a second end of the permitted range of movement. In an embodiment the second over-centre mechanism comprises an arrangement where the pawl pivot moves past the alignment when the actuator torque bar is at the second end of the permitted range of movement.

In an embodiment the first pivot moves from a first past alignment position to a first alignment position when the actuator is part way from the latched position to the unlatched position. In an embodiment the first pivot moves from a first alignment position to a second alignment position when the actuator moves further towards the unlatched position.

In an embodiment the first pivot moves from a second past alignment position to a second alignment position when the actuator is part way from the unlatched position to the latched position.

In an embodiment the pawl comprises a striker pin holding arm. In an embodiment the first linkage comprises a striker pin thrust. In an embodiment the thrust arm is configured to apply a force to the striker pin to move it from the latched position as the pawl is pivoted and as the actuator reaches the second end of the permitted range of movement. In an embodiment the thrust arm is configured to receive a force from the striker pin to move the pawl from the unlatched position and to move the pawl pivot to and then past alignment with the second pivot and the third pivot. In a further embodiment the pawl pivot moves past alignment with the second pivot and the third pivot as the actuator is moved away from the second end of the permitted range of movement.

In an embodiment the latching mechanism comprises a striker pin receiving slot for receiving the striker pin so as to be captured by the pawl.

In an embodiment the striker pin holding arm moves in an arc from the unlatched position in which it is clear of the striker pin receiving slot to the latched position in which the pawl captures the striker pin in the striker pin receiving slot.

In an embodiment the thrust arm moves from the unlatched position in which it covers the striker pin receiving slot to the latched position in which the thrust arm is clear of the striker pin receiving slot.

In an embodiment the first linkage moves in an arc of a first fixed radius about the first pivot. In an embodiment the first radius constrains the distance the first pivot is from the position of the actuator within the permitted range of movement.

In an embodiment the second linkage moves in an arc of a second fixed radius about the first pivot.

In an embodiment the latching mechanism comprises a lock for holding the actuator in the latched position. In an embodiment the lock comprises a pivotable member with a recess therein, which when moved to a lock position nests the actuator in the recess, which prevents movement of the actuator.

According to an aspect of the present invention there is provided a door latching mechanism comprising:

an actuator connected to one or more latches for activation to close the door, wherein the latch comprises a pawl for holding a strike pin of a door frame so as to latch the door closed;

wherein the latch comprises an over centre-mechanism, wherein the over centre-mechanism is configured to move into an over-centre position after door is closed by the actuator, and after the pawl has engaged the striker pin and when the actuator is activated to close the door, and when in the over-centre position the over-centre mechanism blocks movement of the pawl against an opening force applied to the pawl by the strike pin.

In an embodiment the actuator is configured to actuate the latch when subjected to an opening action, wherein the over-centre mechanism is first moved from the over-centre position such that when it is past the over-centre position further movement of the latch actuator moves the pawl so as to release the strike pin, and then further movement opens the door.

In an embodiment the actuator is a handle or a hydraulic or pneumatic circuit, or electrical motor linear actuator.

According to an aspect of the present invention there is provided a door latching mechanism comprising:

an actuator connected to a latch for activation to open the door, wherein the latch comprises a pawl for holding a strike pin of a door frame so as to latch the door closed;

wherein the latch comprises an over centre-mechanism, wherein the over centre-mechanism is configured to move into an over-centre position when the actuator is activated to open the door, and when in the over-centre position the over-centre mechanism blocks movement of the pawl by movement of the actuator until the pawl is moved by the strike pin, wherein further activation unlatches the pawl from the striker pin and further activation opens the door.

In an embodiment the handle is configured to move when subjected to a closing action, the over-centre mechanism is first moved from the over-centre position such that when it is past the over-centre position further movement of the handle moves the pawl so as to capture and then hold the strike pin.

According to an aspect of the present invention there is provided a door latching mechanism comprising:

an actuator connected to a latch, wherein the latch comprises a pawl for holding a strike pin of a door frame so as to latch the door closed;

wherein movement of the actuator so as to close the door moves the door to a closed position, and then continued movement of the actuator in substantially the same manner, when the door is closed, causes actuation of the latch so as to hold the strike pin with the pawl wherein the latch then latches the door, further movement of the actuator in substantially the same manner causes activation of a biasing mechanism which prevents unlatching of the pawl unless a resistance of the biasing mechanism is overcome by movement of the actuator in a manner that would open the door.

In an embodiment the direction of actuation of the handle so as to open the door is such that actuation of the handle actuates the latching mechanism to unlatch the door and then continued actuation of the handle opens the door.

According to an aspect of the present invention there is provided a door latching mechanism comprising:

an actuator connected to a latch, wherein the latch comprises a pawl for holding a strike pin of a door frame so as to latch the door closed;

wherein movement of the actuator so as to open the door when the door is closed is such that before the door is opened, movement of the actuator actuates the latch to unlatch the door, and then continued actuation of the actuator opens the door.

In an embodiment the direction of actuation of the handle so as to close the door is such that actuation actuates the latching mechanism to close the door and then continued actuation of the handle latches the door.

According to an aspect of the present invention there is provided a door latching assembly comprising:

a handle pivotally connected to the door, wherein the handle is connected to the latching mechanism defined above, wherein the handle is connected to the actuator of the latching mechanism such that movement of the handle relative to the door in a first direction causes actuation of the actuator so as to latch the door by moving the pawl to the latching position.

According to an aspect of the present invention there is provided a door latching assembly comprising:

a handle pivotally connected to the door, wherein the handle is connected to the latching mechanism defined above, wherein the handle is connected to the actuator of the latching mechanism such that movement of the handle relative to the door causes actuation of the actuator so as to unlatch the door by moving the pawl to the open position.

According to an aspect of the present invention there is provided a latch assembly for securing a door mounted to a door frame, the assembly comprising:

a striker pin mounted to the door frame;

a latch housing mounted to the door;

a pawl pivotably mounted to the housing and comprising a first arm for holding the striker pin captive relative to the housing when the pawl is in a latching position;

an actuating linkage movable through a range of movement relative to the housing; wherein one end of the actuating linkage is pivotably coupled to the housing;

a connecting linkage pivotably coupled to the first end of the actuating linkage and pivotally coupled to a second arm of the pawl; and a biasing spring connected at one end to the connecting linkage and at another end to the pawl;

wherein when the actuating linkage is moved to a latch position the actuating linkage moves the connecting linkage, which in turn pivots the pawl to move the first arm to the latching position;

wherein when the actuating linkage is moved to an open position the actuating linkage moves the second linkage, which in turn pivots the pawl to move the first arm out of the latching position;

wherein the actuating linkage and connecting linkage are arranged to be in alignment between when the actuating linkage is in the latch position and in the open position, and the biasing spring urges pivot points of the actuating linkage and connecting linkage to move out of alignment.

In this specification the terms "comprising" or "comprises" are used inclusively and not exclusively or exhaustively.

Any references to documents that are made in this specification are not intended to be an admission that the information contained in those documents form part of the common general knowledge known to a person skilled in the field of the invention, unless explicitly stated as such.

SUMMARY OF DRAWINGS

In order to provide a better understanding of the present invention, a detailed description of embodiments of the present invention will now be described by way of example only in which.

DESCRIPTION OF EMBODIMENTS OF THE INVENTION

Figure 1:
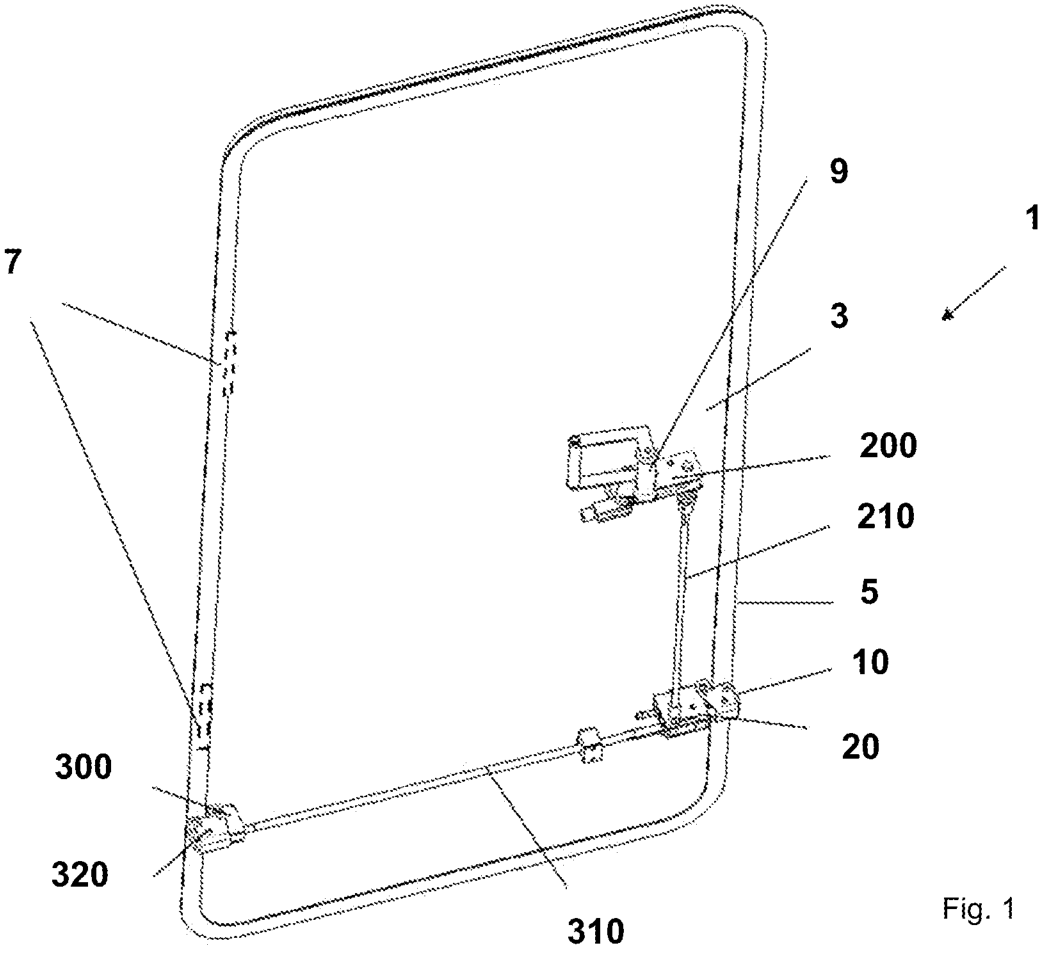
FIG. 1 is a perspective view of a door fitted with a latch assembly according to an embodiment of the present invention.

FIG. 1 shows a door frame 5 in which is mounted a door 3 by hinges 7, which are on the opposite side of the door 3.

Such a door 3 is typically heavy when used for armoured vehicles, security vehicles, sea-going vessels and aircraft, as it needs to withstand significant pressure differentials. Such doors also typically have heavy duty seals with strong resilience that needs to be overcome in order to shut the door. The manner of keeping the door closed is to use a door latching assembly 1, which according to an embodiment of the present invention comprises one or more latches 20 that holds a striker pin 14 (shown in FIG. 2) held by a door frame mount 10 so as to latch the door 3 closed.

Figure 15:
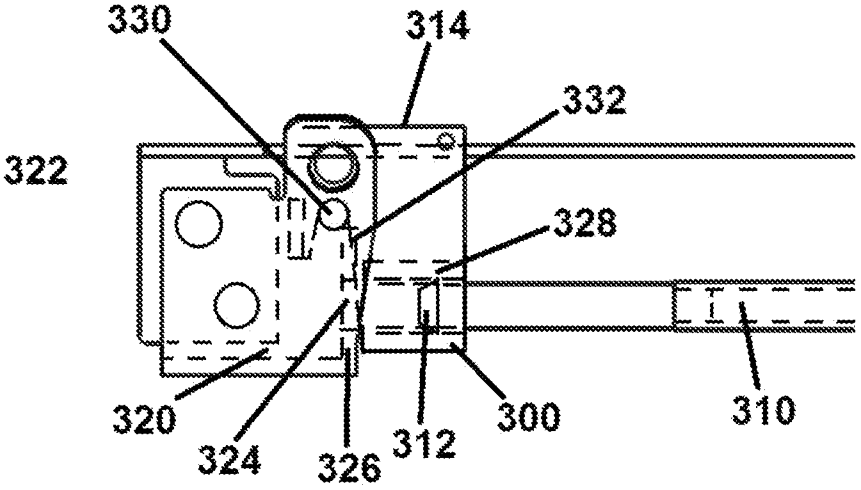
FIG. 15 is a see-through side elevation of an embodiment of a bolt mechanism of the latch assembly of FIG. 1, in an unbolted configuration.

In an embodiment, the latch 20 is operated by a handle 9, or optionally by a powered (hydraulic/pneumatic/electrical) linear actuator, which activates an actuation mechanism 200 for actuation of the latch 20, via drive rod system 210, to either hold the striker pin 14 in place, to latch the door 3, or to release the strike pin 14, so as to unlatch the door 3. The assembly 1 may also comprise a bolt mechanism 300 for applying a bolt 312 (shown in FIG. 15) into a receiver 320, which is actuated by a drive member 310 from the latch 20.

The striker pin 14 extends between opposite sides of a striker body 12 which is mounted to the door frame 5 by the door frame mount 10. Thus the striker pin 14 is fixed in position relative to the door frame 5.

Figure 2:
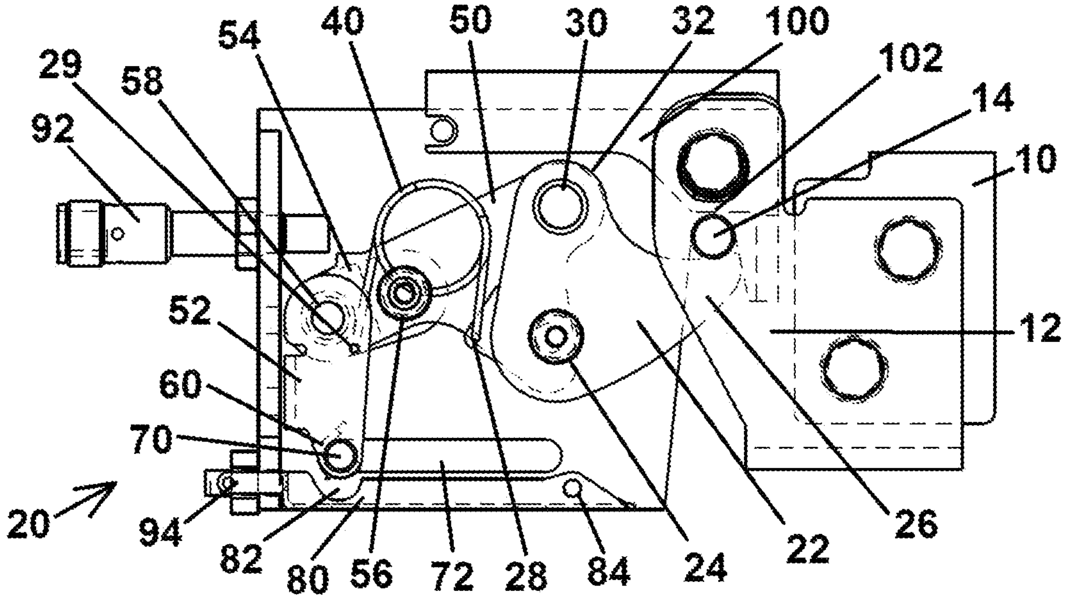
FIG. 2 is a see-through side elevation of an embodiment of a latch mechanism of the latch assembly of FIG. 1, in a latched configuration.
Figure 3:
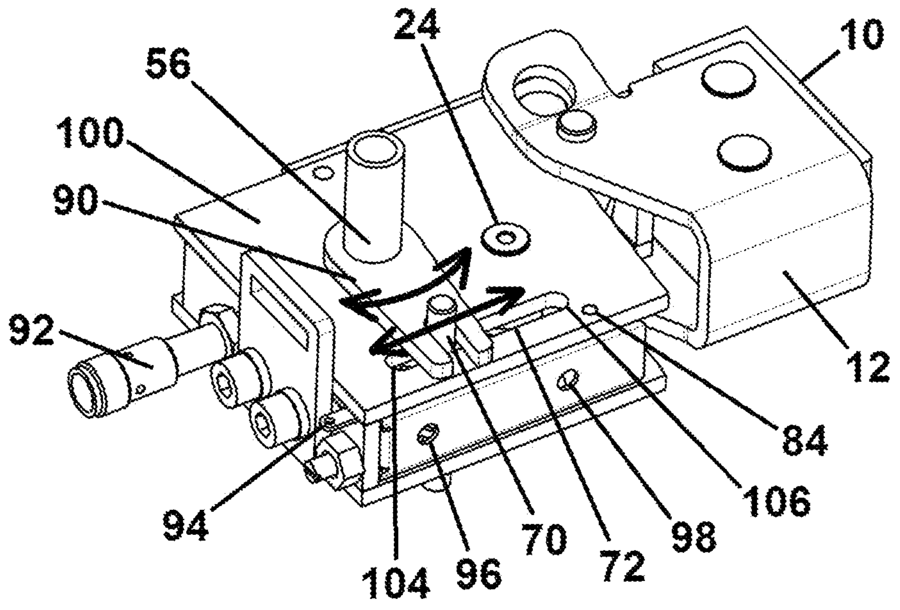
FIG. 3 is a perspective view of the latch mechanism of FIG. 2.
Figure 4:
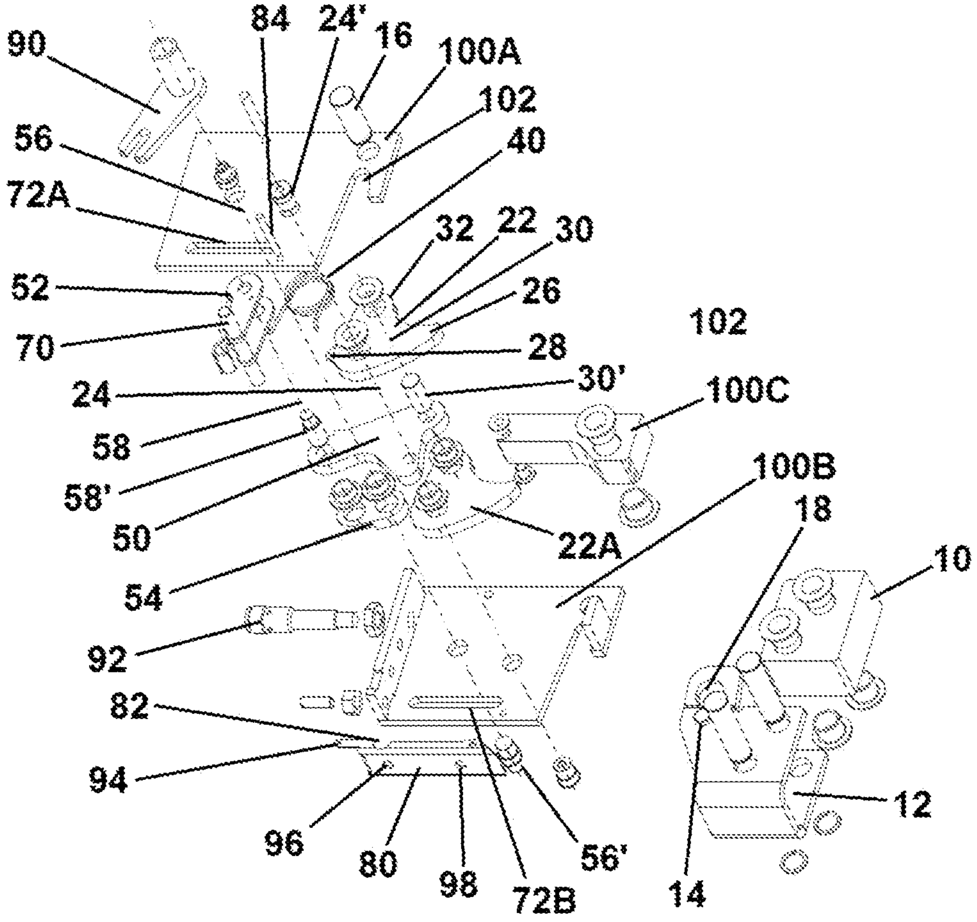
FIG. 4 is an exploded view of the latch mechanism of FIG. 2.

An embodiment of the latch 20 is described in more detail in relation to FIGS. 2, 3 and 4. The latch 20 comprises a body 100 formed of plates 100A and 100B with through-holes to allow pins to pass through. The body 100 is fastened to the door 3, preferably by using pins or welding. The body 100 comprises a recess 102 into which the striker pin 14 is able to be received and held captive by a pawl 22 and optionally a second pawl 22A. The pawl 22 moves the striker pin 14 into the recess 102 and holds it therein so that the door 3 is unable to be open whilst the striker pin 14 is held by the pawl 22. In this situation the door 3 is latched.

The pawl 22 comprises a retaining arm 26 which makes contact with the striker pin 14 and holds it in the recess 102, and a thrust arm 32 against which the striker pin 14 may be thrust or the arm 32 can apply thrust to the striker pin 14. The arms 26 and 32 extend from and are pivotable about a pivot axis 24 formed by the pin 24' (pivot 24), which is fixed relative to the body 100, and thus the door 3.

The pawl 22 further comprises an actuation pivot 30 formed by pin 30' (pivot 30) to which is pivotally connected a first linkage 50. The angle between a line between the actuation pivot 30 and the pivot 24 and a line between the pawl arm 26 and the pivot 24 is fixed. The first linkage 50 is able to move the pawl actuation pivot 30 relative to the pivot 24, which in turn moves the pawl arm 26 by the same angular amount because of the fixed angle relationship. In the embodiment the actuation pivot 30 is on the thrust arm 32.

In this embodiment, the pawl 22 is generally V-shaped, and the V is preferably in the form of a generally heart shaped first plate. Each arm 26 and 32 form lobes of the heart shape and the pivot 24 is close to the point of the heart shape.

The pawl 22 may comprise a complimentary parallel second plate 22A spaced apart from the first plate. The second plate 22A is also pivotable about the pivot 24 and pivotally connected to the linkage 50 at pivot 30. The linkage 50 may be sandwiched between the first plate 22 and the second plate 22A, which cooperate in their interaction with the striker pin 14.

Linkage 50 is pivotally connected to an actuator linkage 52 at a linkage actuation pivot 58 formed by pin 58' (pivot 58).

Actuator linkage 52 is connected to an actuator pin 70 slidable within a slot 72 in the body 100. In an embodiment there are slots 72A and 72B in each plate 100A and 100B respectively, together they are collectively referred to as the slot 72. Preferably the slot 72 is in a straight line, generally parallel to the door 3. Movement of the actuator pin 70 within the slot 72 causes the linkage actuation pivot 58 generally to move towards or away from the pawl's pivot 24, which in turn causes the linkage 50 and thus the pawl 22 to move accordingly. This will be described in more detail further below.

Linkage actuation pivot 58 is also pivotally connected to a control linkage 54, which is connected to linkage pivot 56 formed by pin 56' (pivot 56). Linkage pivot 56 pivots the linkage 54 relative to the body 100. Linkage 54 controls the scope of movement of the pivot 58 by forming an over-centre mechanism as will be described further below.

Linkage actuation pivot 58, linkage pivot 56 and pawl actuation pivot 30 are arranged to be aligned when the actuator pin 70 is at a first transition position near, but not at a latched end of the range of movement 104 (in FIG. 3) of the slot 72. For the majority of the travel of the actuator pin 70 within the slot 72, a line between the pivot 58 and the pivot 56 is at an obtuse angle with a line between the pivot 30 and the pivot 56. When the pin 70 is at the first transition position, a line between the pivot 58 and the pivot 56 is at an angle of about 180 degrees to a line between the pivot 30 and the pivot 56. When the pin 70 is past the first transition position to the end of the slot 72 a line between the pivot 58 and the pivot 56 is at a reflex angle with a line between the pivot 30 and the pivot 56. This arrangement provides a first over-centre-mechanism.

Linkage actuation pivot 58, pivot 24 and pawl actuation pivot 30 are arranged to be aligned when the actuator pin 70 is at a second transition position near, but not at an opposite unlatched end 106 of the slot 72. For the majority of the travel of the actuator pin 70 within the slot 72, a line between the pivot 24 and the pivot 58 is at a reflex angle with a line between the pivot 30 and the pivot 24. When the pin 70 is at the second transition position, a line between the pivot 58 and the pivot 24 is at an angle of about 180 degrees to a line between the pivot 30 and the pivot 24. When the pin 70 is past the second transition position to the opposite end of the slot 72 a line between the pivot 58 and the pivot 24 is at an obtuse angle with a line between the pivot 30 and the pivot 24. This arrangement provides a second over-centre-mechanism.

A coil spring 40 provides a biasing force between the linkage 52 and the pawl 22. The spring 40 is arranged to urge the angle between a line between the pivot 58 and the pivot 56, and a line between the pivot 30 and the pivot 56 to be the reflex angle when the pin 70 is at the end of the slot 72. The spring 40 also urges the angle between a line between the pivot 58 and the pivot 24, and a line between the pivot 30 kind the pivot 24 to be the obtuse angle when the pin 70 is at the opposite end of the slot 72. In other words the spring urges the linkage 54 to keep the pin 70 in its current position at either the latched position 104 or the unlatched position 106.

Preferably the linkage 54 is shorter than the linkage 50.

Linkage 52 has a grasping portion 60 for holding the pin 70 such that as the pin 70 is slid along the slot 72, the linkage 52 follows the pin 70. The handle 9 is connected to the pin 70, as will be described further below, so that movement of the handle 9 causes movement of the pin 70, this in turn actuates the pawl 22, as will be described in more detail below, so that actuation of the pawl 22 moves it to hold or release the striker pin 14, and thus latch or unlatch the door 3.

In this embodiment an actuation arm 90 pivots about pivot 56. As seen in FIG. 3 the actuation arm 90 has a set of tines between which the pin 70 is located so that pivoting of the actuation arm 90 moves the pin 70 within the slot 72.

A lock 80 is pivotally connected at pivot 84 to the body 100. The lock 80 has a recess 82 able to receive the striker pin 70 when the pin 70 is at the latched end 104 of the slot 72. When the lock 80 is pivoted to a locking position so that the pin 70 is received in the recess 82, the lock 80 prevents the pin 70 from movement within the slot 72, thus locking the pawl 22 in the latched position. When the lock 80 is moved to an unlocked position so that the pin 70 is free from the recess 82, the pin 70 is able to move within the slot 72, and thus the pawl 22 is not locked in the latched position. The lock 80 has actuation projection 94 for moving the lock 80 between the locking position and the unlocked position.

The lock 80 forms a bottom wall of the latch 20, and it has two holes 96 and 98 therethrough, which allow a respective part of the grasping portion 60 of the linkage 52 to be seen through the respective holes 96 or 98. As the linkage 52 follows the movement of the pin 70, the angle of the grasping portion 60 presented to the holes 96 and 98 will change, so that if different positions on the grasping portion 60 are provided with a different colour, the colour seen from holes 96 and 98 can change according to the position of the pin 70 within the slot 72. This in turn allows different colours to be used (such as red for latched, and green for unlatched) and seen through the respective holes 96 and 98 to enable easy recognition of the state of the latch according to the colour seen through one or the other of the holes 96 and 98. Hole 96 shows a red portion of the grasping portion 60, indicating that the latch 20 is latched.

Alternatively, or in addition, a sensor, such as an optical sensor 92 can be used to determine whether the linkage is positioned in the over-centre position.

Figure 5:
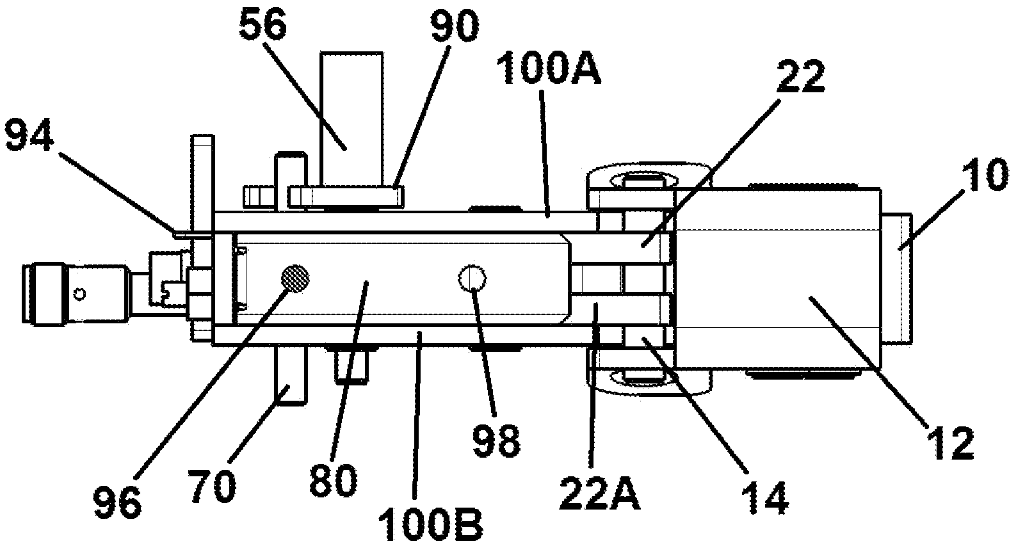
FIG. 5 is an end view of the latch mechanism of FIG. 2.

In FIG. 5, the pin 70 is at the latched end of the slot 72 (slot 72 is not seen in FIG. 5) and thus the red coloured portion of the linkage 52 is seen through the hole 96 indicating that the latch is latched. No coloured portion is seen through hole 98.

Figure 6:
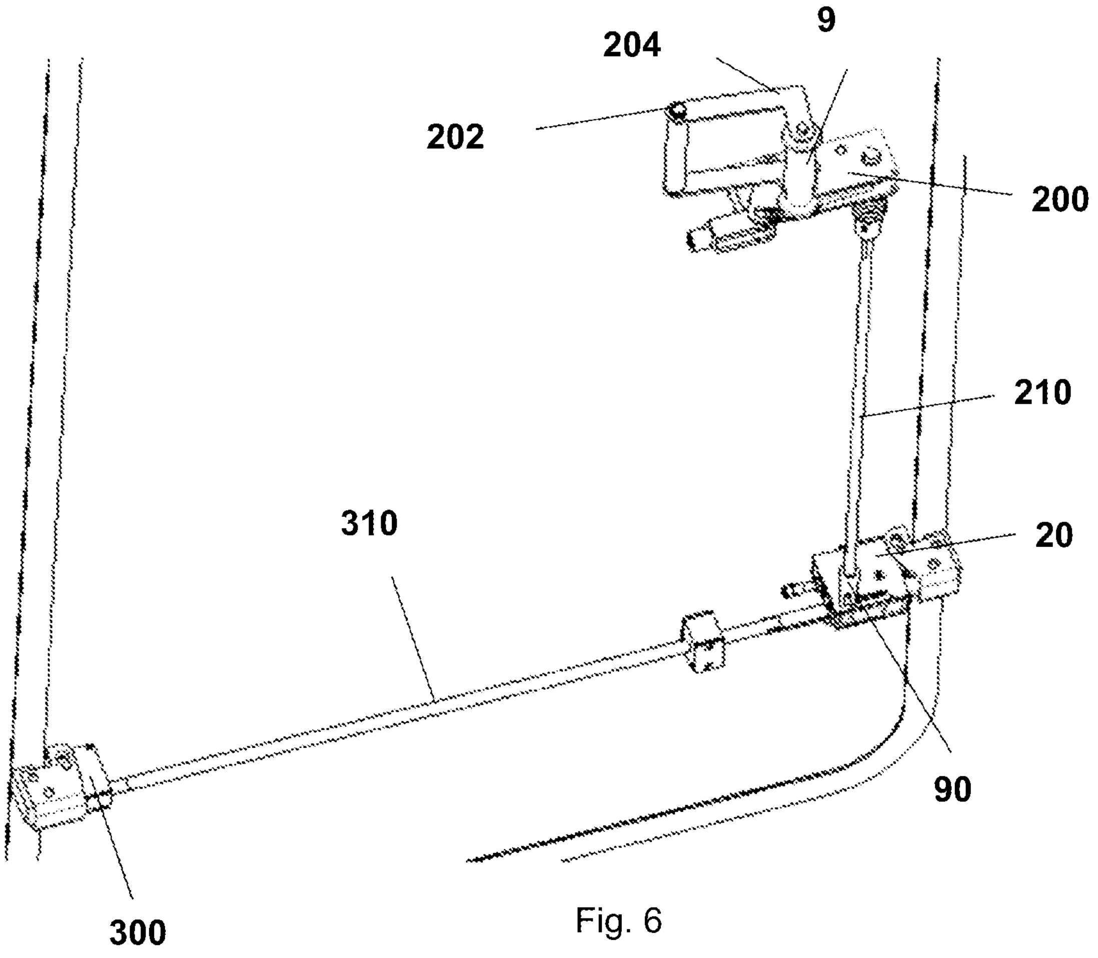
FIG. 6 is an enlarged view of the latch assembly of FIG. 1, in the latched configuration.

Referring to FIG. 6, it can be seen that the handle 9 is pivotally connected to the door 3 at 202 by a pair of L shaped connections 204. The handle 9 is able to pivot towards the door 3 and away from the door 3, when the door 3 is closed so as to latch or unlatch the latch 20, as well as swing the door 3 open or closed, when the latch 20 is unlatched. This single movement action in either direction is an advantageous benefit of some embodiments of the present invention.

Handle 9 is connected to the latch 20 via the actuation mechanism 200 and the drive rod system 210. Drive rod system 210 is connected to actuation arm 90 such that rotation of the drive rod 210 pivots the actuation arm 90 so as to move the pin 70 within the slot 72. Further movement of the pin 70 also advances or withdraws the drive member 310 so as to activate the bolt mechanism 300, as will be described further below.

Figure 7:
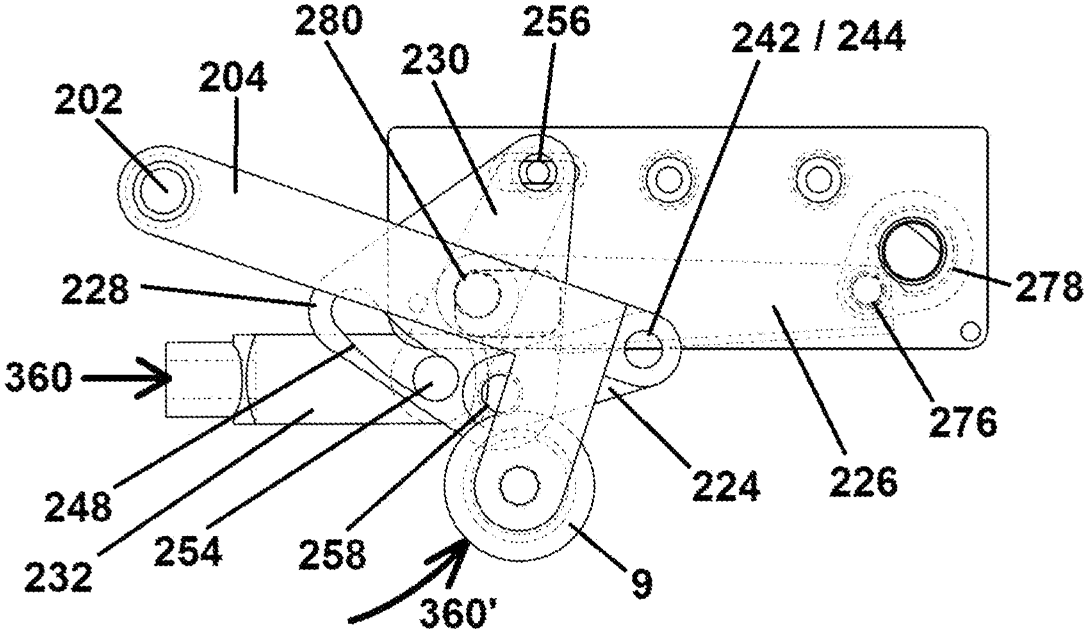
FIG. 7 is a see-through plan view of an embodiment of an actuator mechanism of the latch assembly of FIG. 1, in a door closed and latched configuration.
Figure 8:
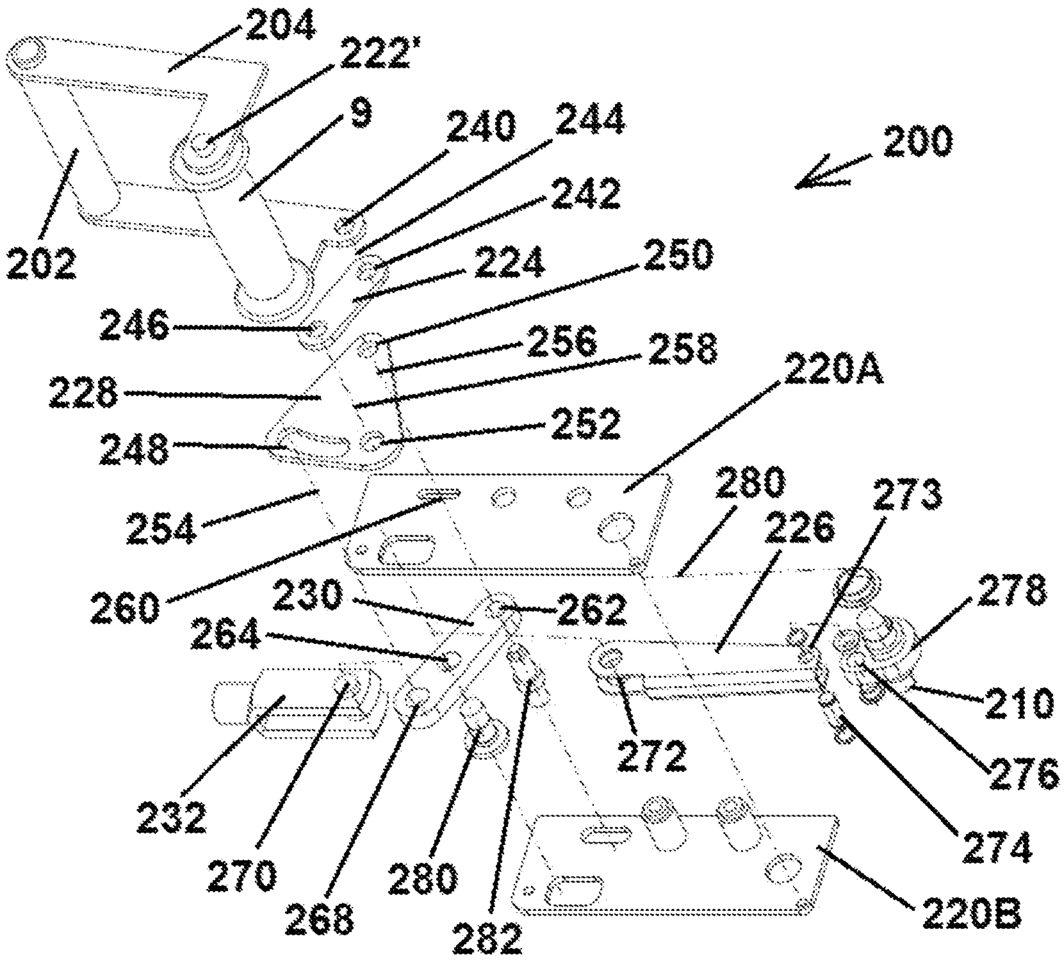
FIG. 8 is an exploded view of the actuator mechanism of FIG. 7.

FIGS. 7 and 8 show the actuation mechanism 200 in more detail. Actuation mechanism has a body formed of two parallel plates 220A and 220B which are connected to each other and surround the linking parts described below. The body is fixed to the door 3, preferably by screws, bolts, rivets or welding. The pair of L shaped connections 204 have a pivot point 202 for connection to the door 3 and at the end of the base of the L is a spindle 222 (not seen in FIG. 8) and a corresponding spindle 222' (on the visible side of the handle 9 in FIG. 8), which extends between each of the pair of the L shaped connections 204. The spindle 222 carries the handle 9 on the L shaped connection 204. One of the L shaped connections 204 has a projection from a bend of the L shape, which comprises a pivotal connection 244 via a pin (not shown) to a hole 242 of a linkage 224. Hole 246 of linkage 224 is pivotally connected to a hole 252 of a triangle linkage 228 at pivot axis 258. Hole 250 of triangle linkage 228 is pivotally connected at pivotal axis 256 to pin 282, which in turn is connected to the plates 220A and 220B, and through hole 262 to linkage 230. Thus triangle linkage 228 and linkage 230 can pivot about holes 250 and 262, respectively, with respect to the plates 220A and 220B. Triangle linkage 228 has a slot 248 in which pin 270 is able to travel. The pin 270 extends through pivot axis 254. Preferably the slot 248 is arcuate and of constant radius relative to pivot axis 256. Pin 270 extends through hole 268 of linkage 230. Linkage 230 has a hole 264 between holes 262 and 268. Hole 264 receives pin 280 which also extends through hole 272 of thrust linkage 226. Thrust linkage 226 is pivotally connected to a hole 276 of a crank 278 via a hole 273 in the linkage 226 which receives pin 274, which in turn is connected to the drive rod 210. Crank 278 is rotatable about axis 280 with respect to the plates 220A and 220B.

Pin 270 is between tines of a linear actuator connection 232. The linear actuator connection 232 allows for connection to a linear actuator, which can be used to drive the pin 270 so as to actuate the linkage 230, and in turn linkage 226, and crank 278 so as to rotate the rod 210, without need to use the handle 9. The slot 248 may be long enough to allow the actuator to move the linkage 230 whilst pin 270 slides within the slot 248. As such the handle 9 can be used to manually override the linear actuator.

In FIG. 6 the door 3 is closed and rod 210 has been rotated clockwise, so that the actuation arm 90 has moved the pin 70 to the latched position at the end of the slot 72. Thus the door 3 is also latched closed. The process of unlatching and opening the door will now be described.

Opening and Unlatching the Door

Referring to FIG. 7, to open the door 3, linear actuator moves the connection 232 in a direction of arrow 360 so as to push the pin 254 to rotate the linkage 230 anticlockwise. Alternatively, a person pushes on the handle 9 as indicated by arrow 360'. This commences movement of the handle 9 anti-clockwise about pivot 202. Pivot 244 connected to the L shaped member 204 moves in an arc about the pivot 202. This in turn draws linkage 224 to follow this arc. This in turn, via pivot 258, draws on the triangle member 228 to cause it to pivot anticlockwise about pivot 256. As the triangle member 228 pivots the pin 254 will travel through the slot 248 until it reaches the second end, at which point further pushing on the handle 9 and thus pivoting of the tringle member 230 causes pin 254 to move in an arc about pivot point 256. This in turn will pivot linkage 230 anticlockwise.

Anticlockwise moving of the linkage 230 will also move pivot 280. This will drive linkage 226 towards the crank 278 causing the pivotal connection 276 to rotate the crank 278, which in turn rotates the rod 210 in an anti-clockwise direction.

Figure 9:
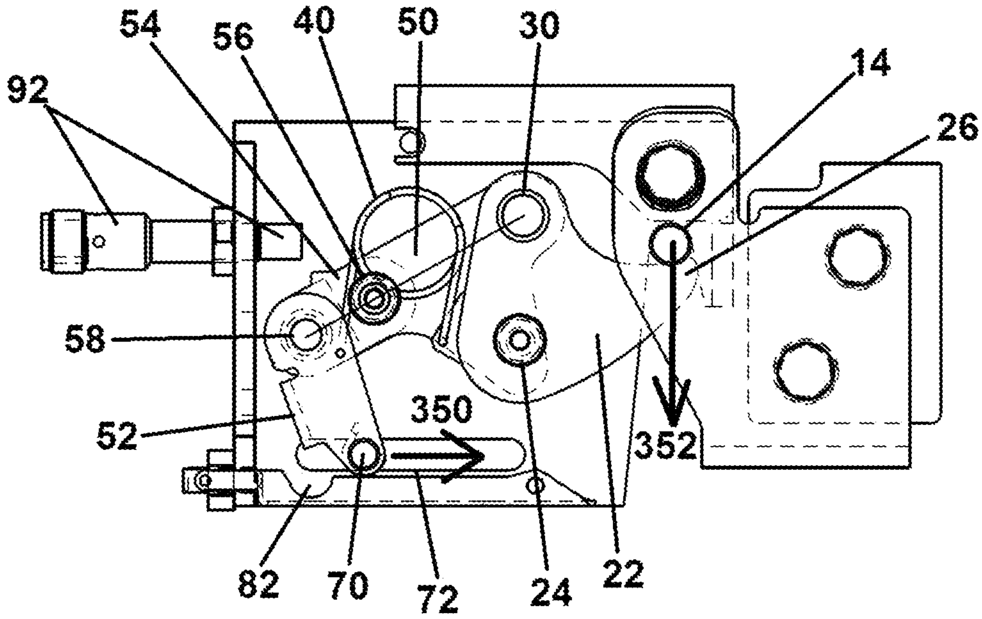
FIG. 9 is a see-through side elevation of the latch assembly of FIG. 2, in an unlatching state.

Rotation of the rod 210 rotates the actuation arm 90, which in turn commences movement of the pin 70 within the slot 72 toward the unlatched position, as seen in FIG. 9. Movement of the pin 70 causes the linkage 52 to follow the pin 70. This movement of the linkage 52 causes the pivot point 58 and the linkage 54 to rotate about the pivot 56 so that pivots 58, 56 and 30 are moved from the past over-centre position to a top dead centre position where they are aligned, as shown. In doing so the resistance of the spring 40 must be overcome. Sensor 92 can detect that the link 50 is no longer in the over-centre position and so the latch 22 is no longer in the latched position.

The spring 40 will urge the pivot 58 back to the position of FIG. 2. This prevents the latch from inadvertently unlatching.

Further pushing on the handle 9, or further movement of the connection 232 with the actuator will, via linkages 230 and 226, crank 278 and rod 210, move the pin 70 further along the slot 72, as indicated by arrow 350.

Figure 10:
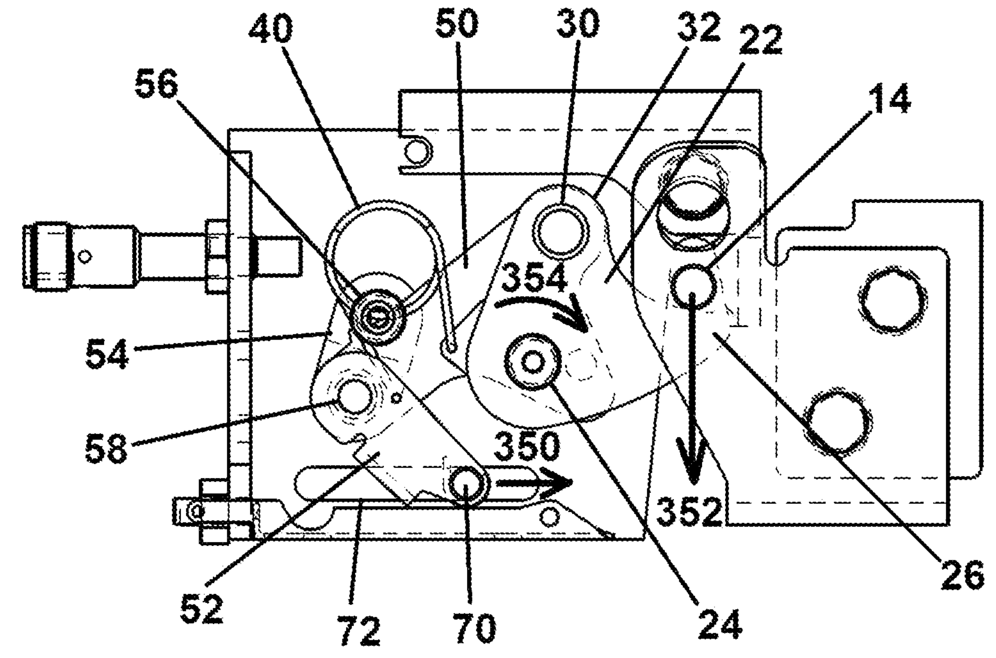
FIG. 10 is a see-through side elevation of the latch assembly of FIG. 2, continuing in the unlatching state.

As shown in FIG. 10, this will result in the continued movement of the linkage 52 which also drives linkage 50 past the pivot 24 so as to cause pivot 30 to rotate in an arc about pivot 24. This rotates the pawl 22 as indicated by arrow 354. This movement of the pawl 22 moves arm 26, which commences release of the striker pin 14. The release of the pin 14 may allow the compressed door seal to resiliently move the striker pin 14 in direction 352 so as to commence movement of the door 3.

Further pushing on the handle, or further movement of the connection 232 with the actuator will again, via linkages 230 and 226, crank 278 and rod 210, move the pin 70 further still along the slot 72 as indicated by arrow 350.

Figure 11:
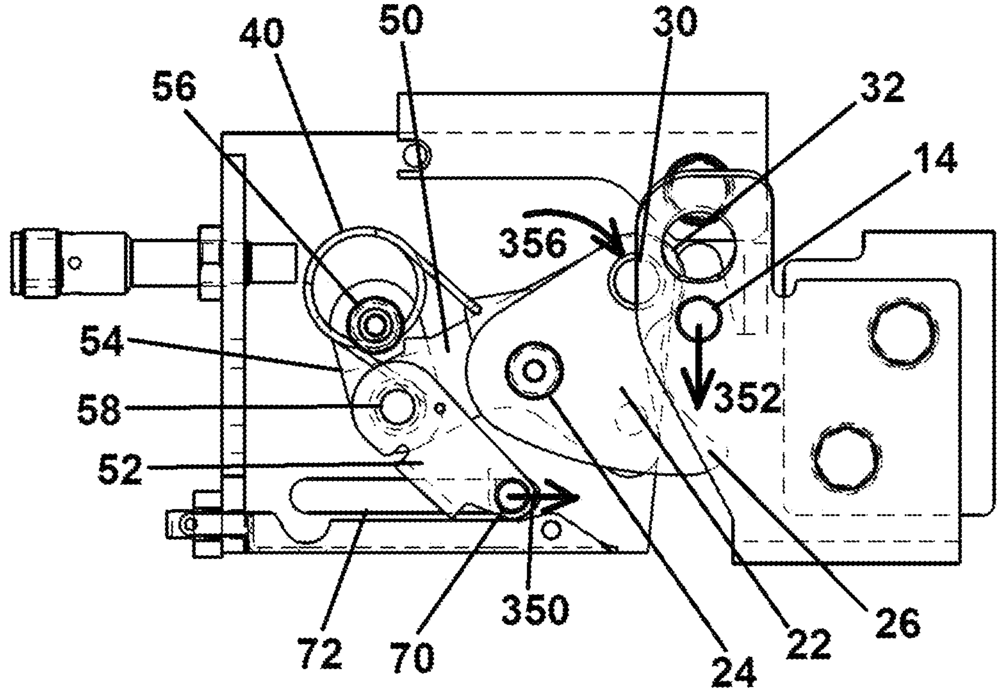
FIG. 11 is a see-through side elevation of the latch assembly of FIG. 2, entering an unlatched configuration.

As shown in FIG. 11, this will result in the continued movement of the linkage 52 which also drives linkage 50 so as to cause pivot 30 to continue to rotate in an arc about pivot 24. This further rotates the pawl 22 as indicated by arrow 356. This movement of the pawl 22 moves thrust arm 32 to make contact with the pin 14. With the resilience of the seal released adhesion or a pressure differential between opposite sides of the door 3 may make the door 3 somewhat stuck on the seal. The pressure of the arm thrust 32 on the striker pin 14 will prize the door 3 from the seal, forcing the striker pin 14 to move in the direction indicated by arrow 352. At this point the pin 70 is near the unlatched end of the slot 72.

Figure 12:
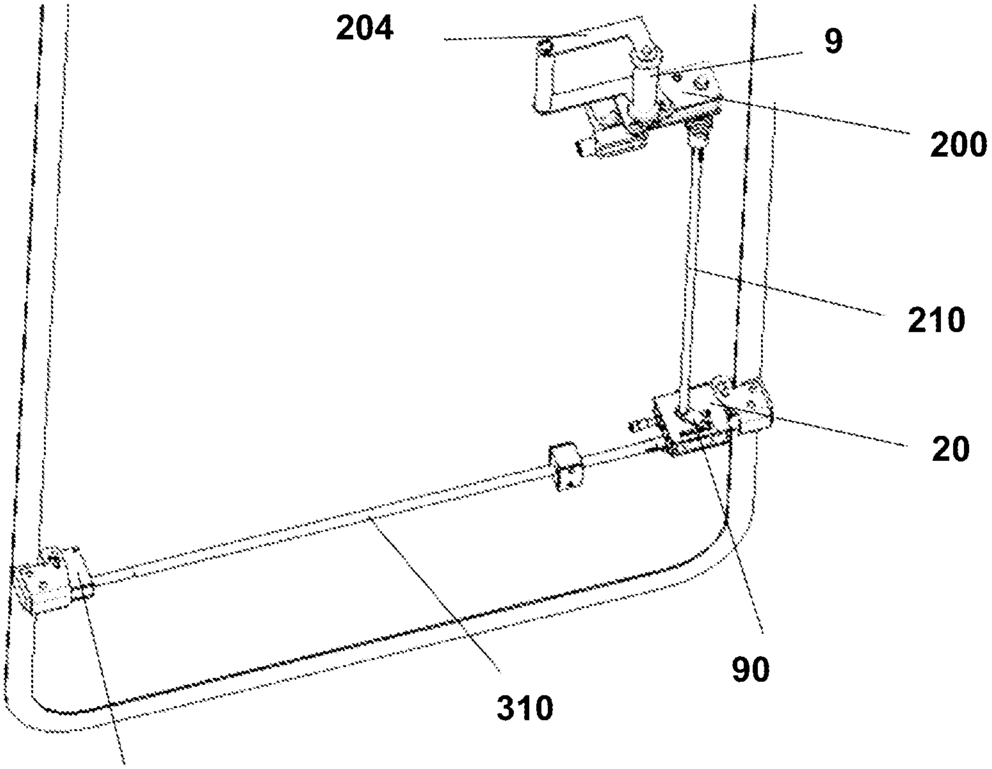
FIG. 12 is an enlarged view of the latch assembly of FIG. 1, in the unlatched configuration.

When the pin 70 is near the end of the slot 72 the pivot 58, pivot 24 and pivot 30 will be aligned, in a top dead centre position, and spring 40 will be tightened as the pivots move to this position. Further pushing of the handle 9 will complete the movement of the pin in the slot 72 to the unlatched position as can be seen in FIG. 12, in which the actuator arm 90 is now fully in the anti-clockwise rotated position.

The spring 40 urges the pawl 22 to continue to rotate as the pin 70 completes this movement in the slot 72 to the unlatch position 106. When the pin 70 is in the unlatched position 106 (FIG. 3), the pivot 30 will have rotated out of alignment with pivots 24 and 58 and will be past the top dead centre position in a past over-centre position. The pawl 22 arm 26 contacts the plate 100 and is prevented from further rotation.

Movement of the pivot 30 back toward the top dead centre position causes tightening of the spring 40, so the spring is continually urging the pivot to remain in the past over-centre position, which prevents inadvertent movement of the pawl 22, and in particular movement of the arm 26 which could block the striker pin 14 from entering the recess 102.

Figure 17:
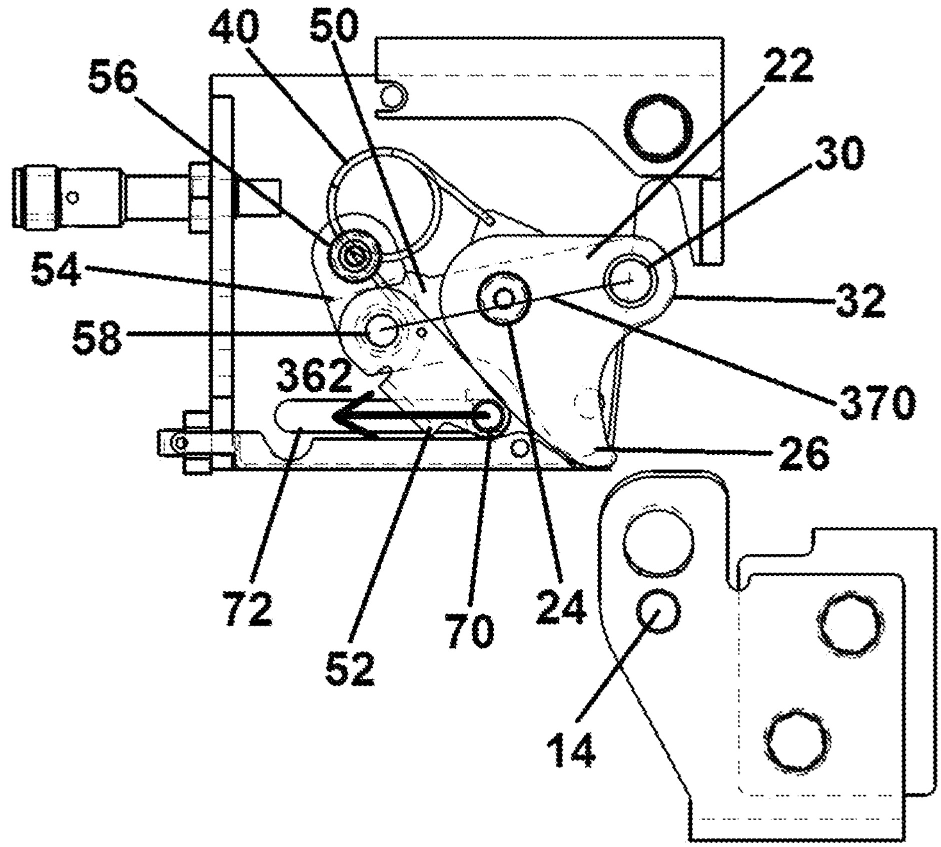
FIG. 17 is a see-through side elevation of the latch assembly of FIG. 2, in an unlatched, door open configuration.

When the pin 70 is fully at the unlatched position, the linkage 52 will have caused the linkage 50 to rotate the pawl 22 so that the thrust arm 32 blocks entry into the recess 102 as seen in FIG. 17.

Figure 13:
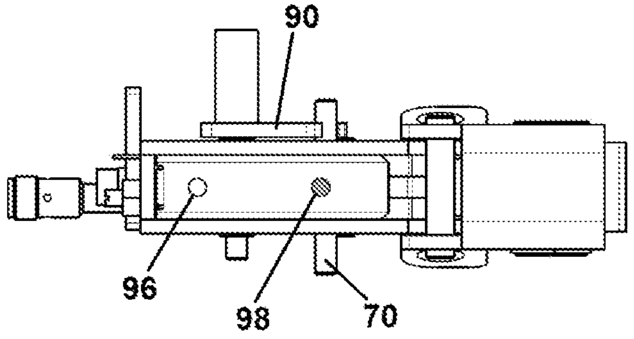
FIG. 13 is an end view of the latch mechanism of FIG. 2, in the unlatched configuration.

Referring to FIG. 13, when the pin 70 moves to the unlatched position in slot 72 the grasping portion 60 of linkage 52 is rotated relative to the hole 98 so that it is positioned in line with the hole 98. An unlatched indicative colour (such as green) is seen through the hole 98 indicating that the latch 20 is unlatched.

Figure 14:
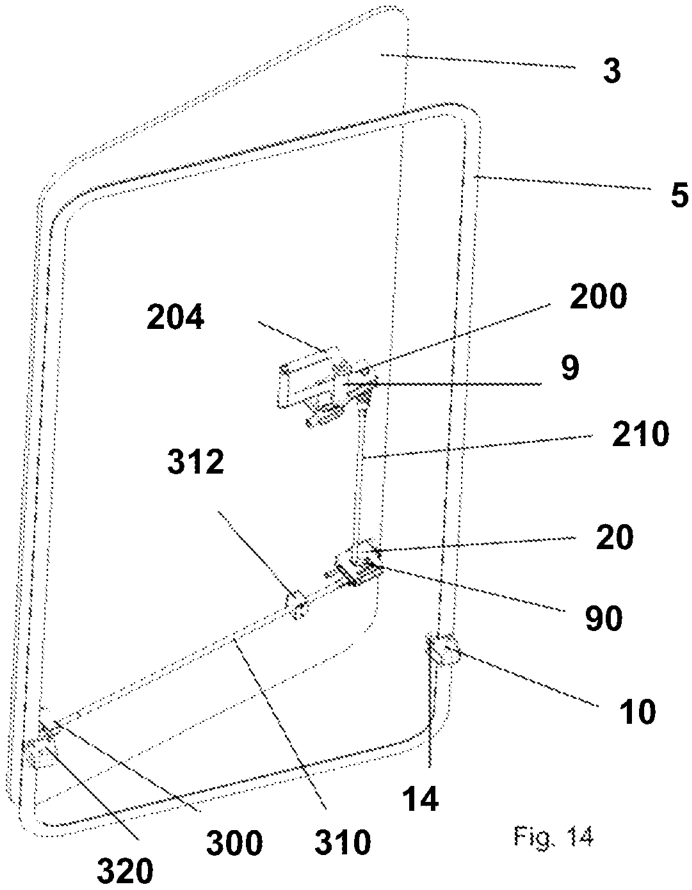
FIG. 14 is a perspective view of the latch assembly of FIG. 1, with the door being opened.

Because the pin 70 is at the end of the slot 72, rod 210 can rotate no further and thus activation mechanism 200 has no more give arising from actuation of the latch 20. When there is no more give in the actuation mechanism 200, further pushing on the handle 9 results in the door 3 swinging open as seen in FIG. 14.

In an embodiment there is also a bolt mechanism 300 for bolting the door closed. The bolt mechanism 300 is on the same side to the hinge side of the door 3. As seen in FIGS. 15, and 24 to 26, the bolt receiver 320 comprises a bolt striker 322 attached to the door frame 5. The receiver 320 comprises a striker pin 330, and a keeper 326 in which is a hole 324 for receiving the bolt. The bolt mechanism 300 comprises a body 314 attached to the door 3 and a bolt in the form of a bolt head 312 which enters the hole 324 when the bolt mechanism 300 is bolted, and is withdrawn from the hole 324 when the bolt mechanism 300 is unbolted. The bolt mechanism 300 further comprises a guide 328 in which the bolt head 312 is able to slide, and a slot 332 which is able to receive the striker pin 330 when the door 3 is closed.

While the latch 20 is being unlatched, the holt mechanism 300 is being unbolted. As the pin 70 moves to the unlatched position in the slot 72, this in turn causes the drive member 310 to be drawn towards the latch 20 by adaptor 314 (shown in FIG. 24). As the drive member 310 moves in a direction right of the page, the bolt head 312 will be withdrawn from the hole 324 in the keeper 326, thereby unbolting the bolt mechanism 300.

Closing and Latching the Door

Figure 16:
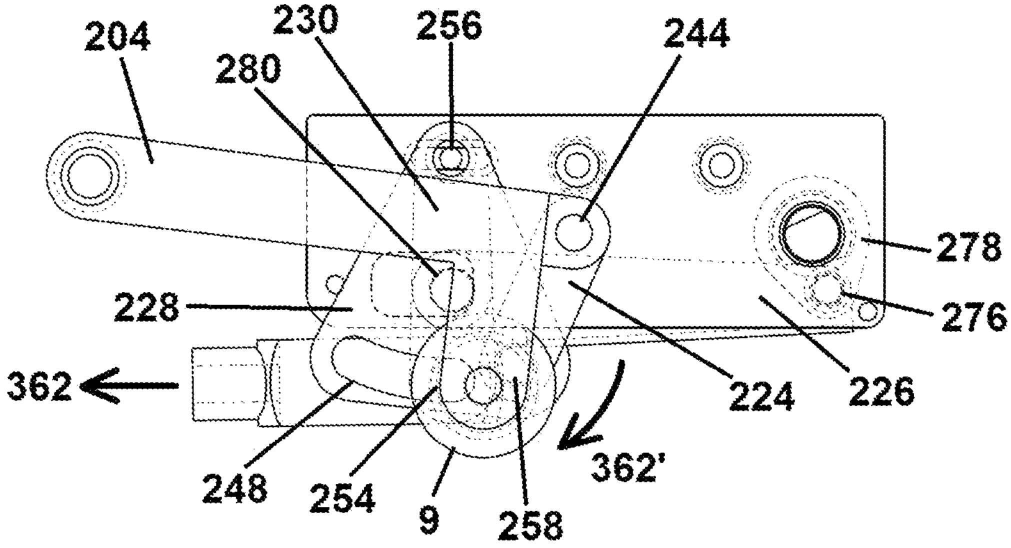
FIG. 16 is a see-through plan view of the actuator mechanism of FIG. 7, in a door open and unlatched configuration.

When the door 3 is desired to be closed, a person grasps the handle 9 and pulls on it as indicated by arrow 362 of FIG. 16. The force of pulling on the handle 9 wants to pivot the L shaped member 204 and thus the linkage 224 and in turn the triangle member 228. Triangle member 228 in turn wants to pivot about pivot 256 and via pivot 280 pulls on linkage 226, which urges the crank 278 to rotate in a clockwise direction. This torque is transferred via rod 210 and actuation arm 90 to the pin 70, and urges the pin 70 to move from the unlatched position in the slot 72.

Figure 18:
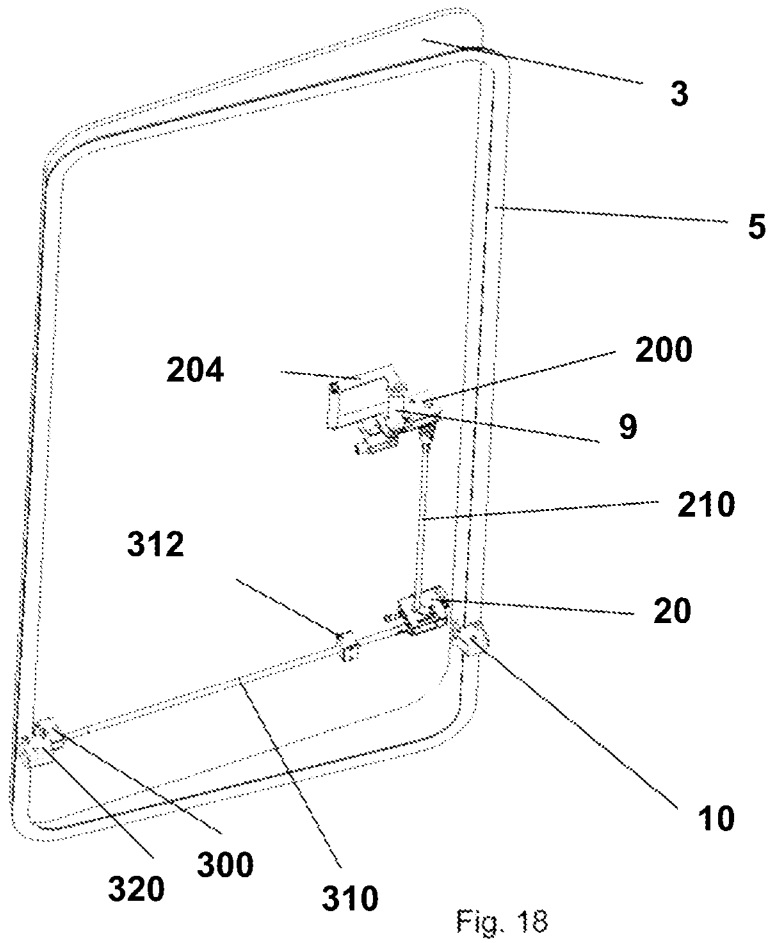
FIG. 18 is a perspective view of the door of FIG. 1 moving towards being closed.
Figure 19:
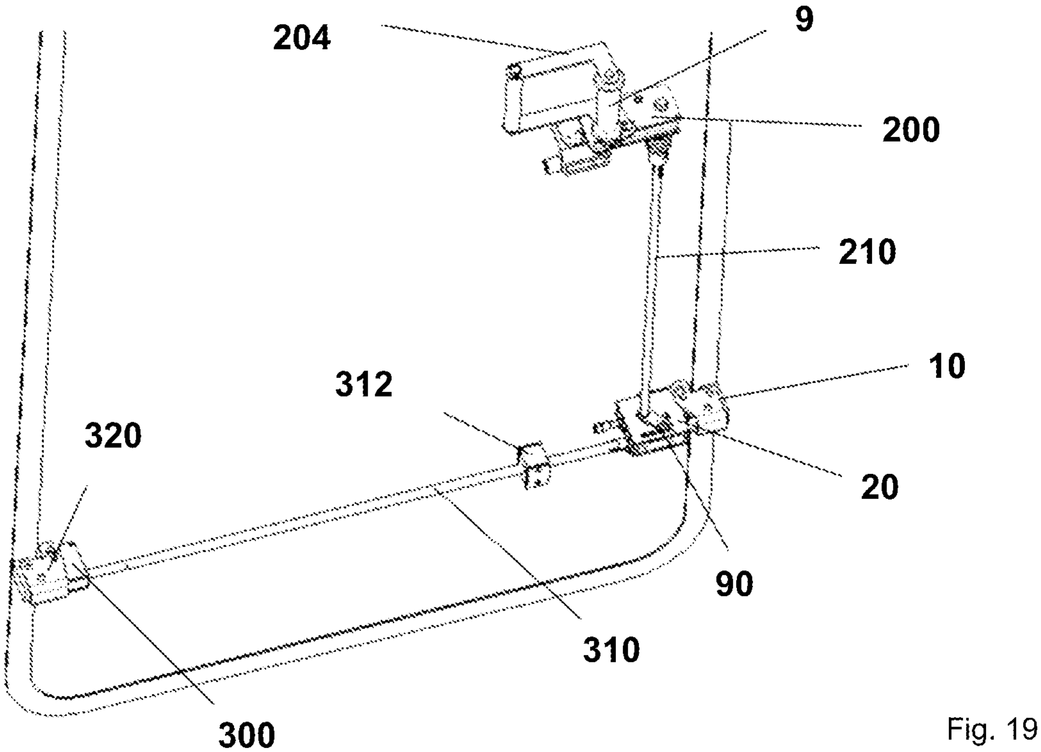
FIG. 19 is a perspective view of the door of FIG. 1 in the closed position, but unlatched.

As seen in FIG. 17, pulling on the pin 70 urges the link 52 to move, which in turn urges the linkage 52 to move in direction 362, which in turn urges the linkage 50 to move in direction 362. However as the pivot 30 is past alignment with the pivot 24, all pulling on the pin 70 does is to urge the pawl 22 to continue to try to rotate in the clockwise direction, which it is prevented from doing by arm 26 being blocked by the pin 70. Accordingly pulling on the handle 9 does not cause components in the actuation mechanism 200 or the latch 20 to move. Instead the door 3 moves. The door 3 can therefore be pulled towards the closed position as shown in FIG. 18, until it is closed as indicated by FIG. 19.

Figure 20:
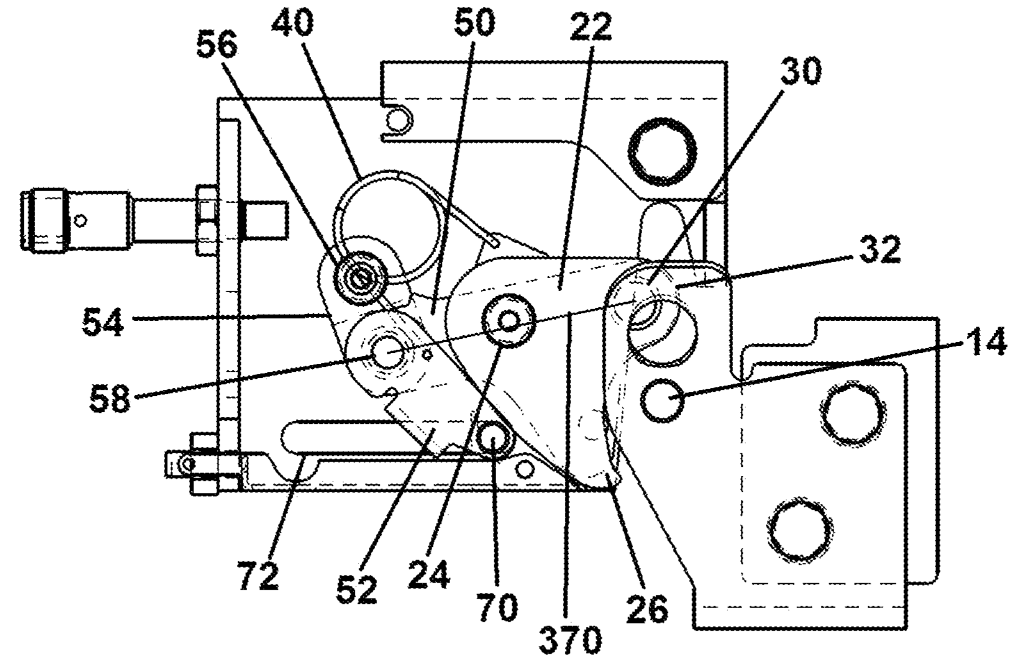
FIG. 20 is a see-through side elevation of the latch assembly of FIG. 2, in an unlatched, door closing configuration.
Figure 21:
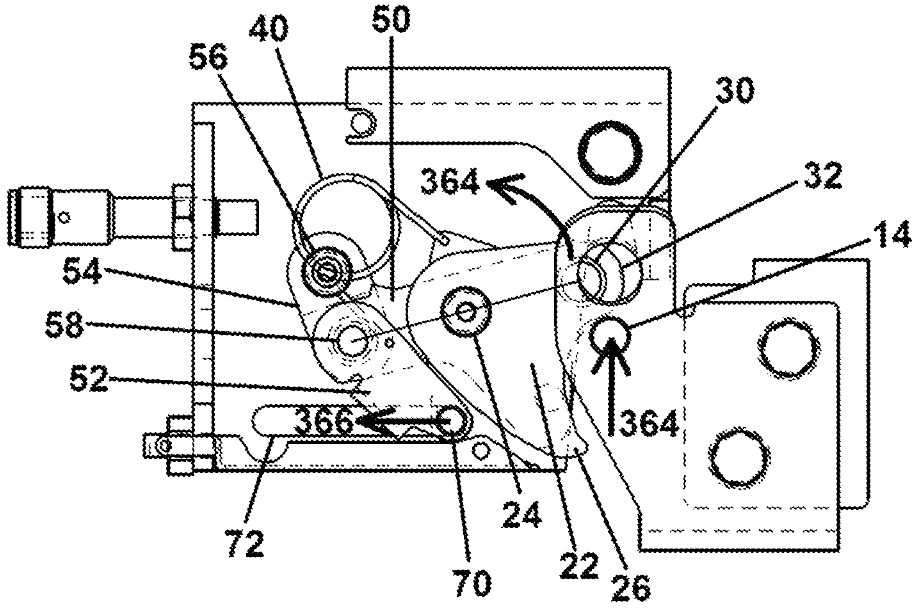
FIG. 21 is a see-through side elevation of the latch assembly of FIG. 2, in commencement of latching process.

Referring to FIG. 20, as the door 3 approaches the closed position, the striker pin 14 will approach the arm 32 of pawl 22. As the pin 14 contacts the pawl 22, as seen in FIG. 21, it causes the pawl 22 to rotate in an anticlockwise direction, which in turn causes the pivot 30 to move to and then past the top dead-centre position. The resilience of the spring 40 must be overcome to do this. The pin 70 can now begin to move within the slot 72 towards the latched position as indicated by arrow 366.

Preferably at this point, but more preferably not before, the door 3 will contact the door seal, which needs to be compressed in order to properly close the door 3.

Now that the pin 70 is able to move within the slot 72, further pulling on the handle 9 now activates the actuation mechanism 200. The person can continue pulling on the handle 9, or the actuator can be used. If the actuator is used, linear actuator moves the connection 232 in a direction of arrow 362 so as to pull the pin 254, which will rotate the linkage 230 clockwise.

Alternatively the person continues to pull on the handle 9, which now allows pivot 244 connected to the L shaped member 204 to move in an are about the pivot 202. This in turn draws linkage 224 to follow this arc. This in turn, via pivot 258, draws on the triangle member 228 to cause it to pivot clockwise about pivot 256. This in turn causes the pin 254 to rotate the linkage 230 clockwise.

With either of these options, pivoting of the linkage 230 causes pivot 280 to rotate clockwise and pulls on linkage 226, which rotates the crank 278 in a clockwise direction. This rotation of the crank 278 rotates the rod 210 and actuation arm 90 in a clockwise direction. This moves the pin 70 from the unlatched position in the slot 72 towards the latched position as indicated by arrow 366.

Figure 22:
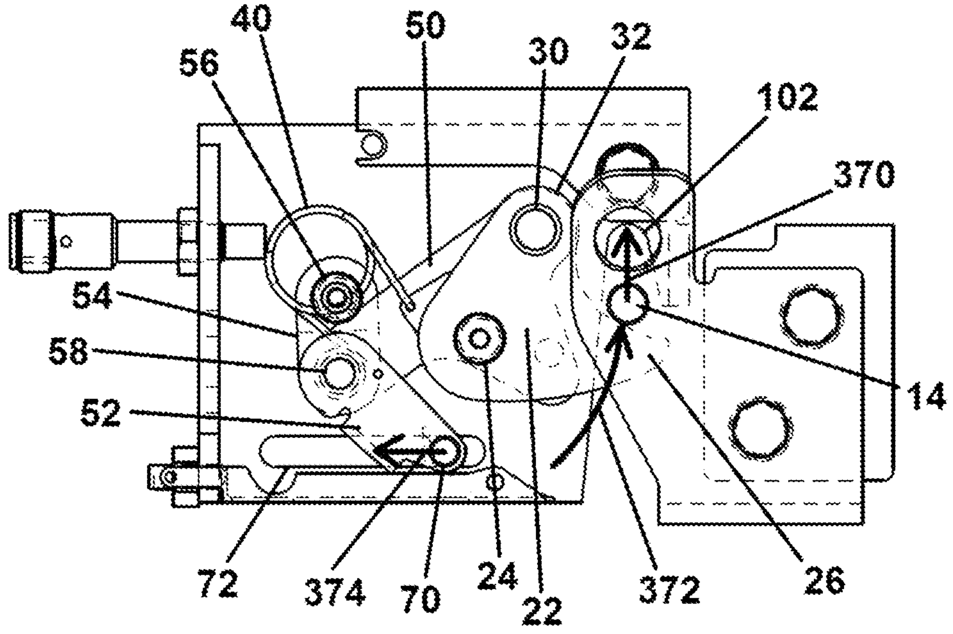
FIG. 22 is a see-through side elevation of the latch assembly of FIG. 2, progressing to the latching state.

Referring to FIG. 22, now the movement of the pin 70 moves the linkage 52. This pivots the linkage 54 and drives the linkage 50, so as to pull on the pivot 30. Pulling on pivot 30 continues to rotate the pawl 22 in an anticlockwise direction. The arm 26 then contacts the striker pin 14 and forces it to move as indicated by arrow 370 into the recess 102. This forces the door 3 against the seal. This continues until the pin 14 is fully received in the recess 102 by the action of the arm 26, thus compressing the seal.

Figure 23:
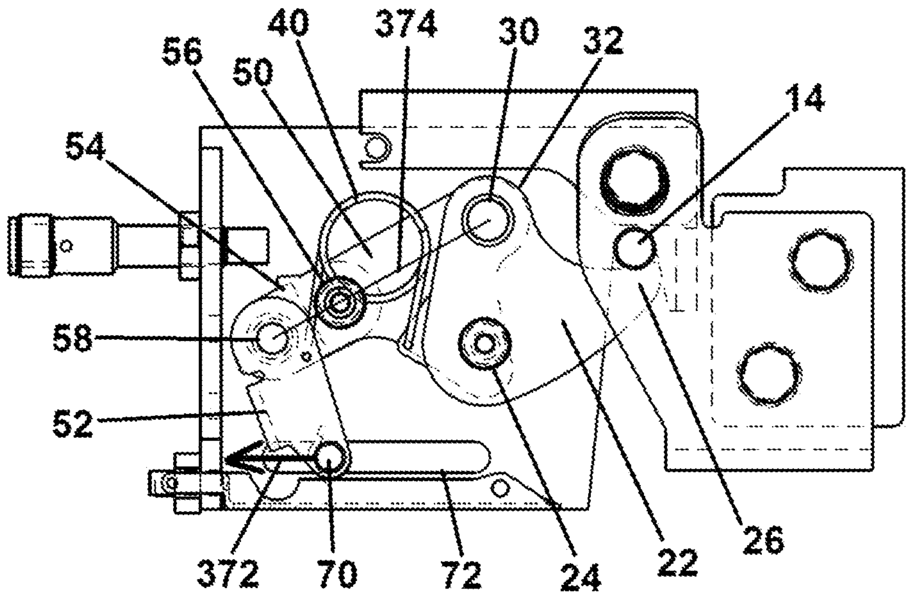
FIG. 23 is a see-through side elevation of the latch assembly of FIG. 2, entering the latched state.
Figure 24:
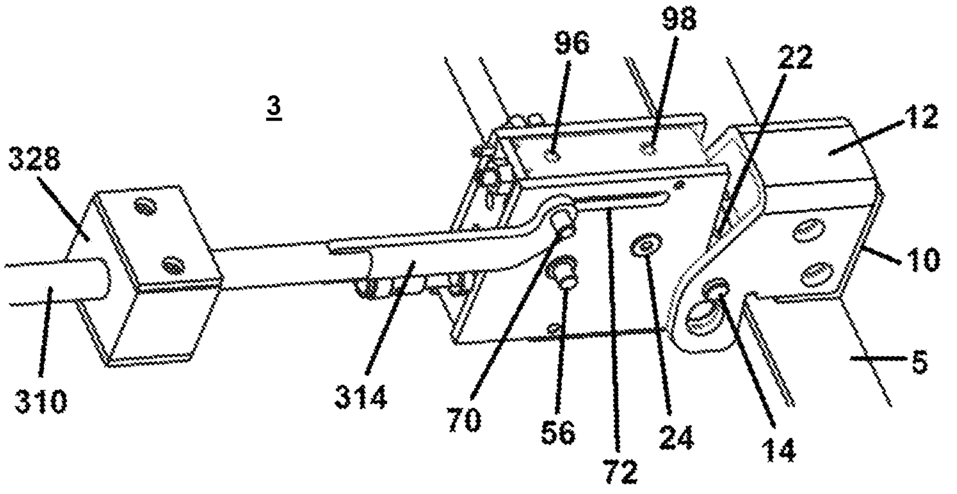
FIG. 24 is a perspective view of the latch assembly of FIG. 2, in the latched configuration.

At the point shown in FIG. 23, the pin 70 is near the latched end of the slot 72. Further the pivot 58 is aligned with pivot 56 and pivot 30 in the top dead-centre position. The spring 40 is also compressed at this point. The final movement of the pin 70 moves the pivot 58 past the top dead-centre position to the past over-centre position and releases the spring 40, so that the latch 20 is hack in the latched configuration shown in FIG. 2.

In the latched position an internal force on the door 3 causes the striker 14 to want to pivot the pawl 22 open. Since the latch 22 is in the latched over centre position, the force excited on the pawl 22 causes the linkage 50 to want to move further over centre, which it cannot due to the actuator mechanical limits (slot, pin or interference of parts). Thus the striker 14 is contained within the latch 22 until something breaks. Each latch size may be rated for a given internal and external force guaranteed not to break the latch 22 and leave the door unlatched.

There may be latch overload springs included in the linkage 210 between the handle mechanism 200 and the latch 22, in order to protect the latch from damage caused by high forces exerted on the handle and/or to allow the latches to latch individually, beneficial for a deformed door.

Figure 25:
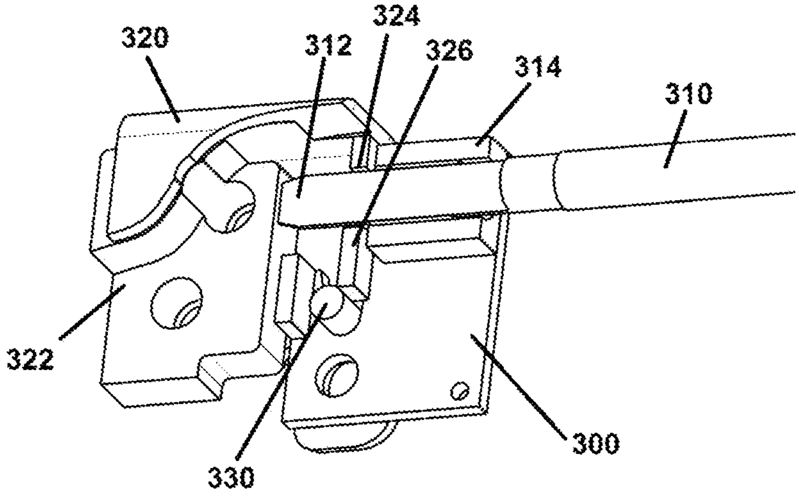
FIG. 25 is a see-through perspective view of the bolt mechanism of FIG. 15 in a bolted configuration.
Figure 26:
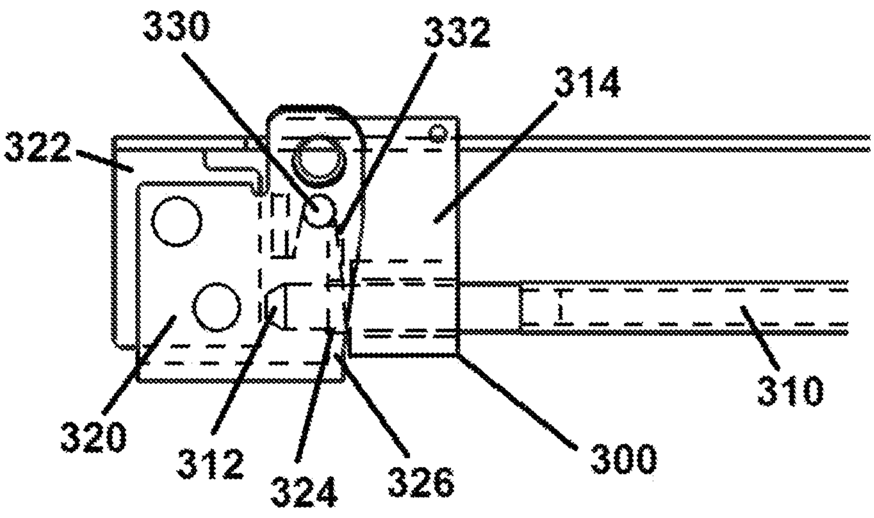
FIG. 26 is a cross-sectional side elevation of the bolt mechanism of FIG. 15 in the bolted configuration.

In the embodiment with the bolt mechanism 300, while the latch 20 is being latched, the bolt mechanism 300 is being bolted. As the pin 70 moves to the latched position in the slot 72, this in turn causes the drive member 310 to be pushed towards the latch 20 by adaptor 314. Referring to FIGS. 25 and 26, as the drive member 310 moves in a direction left of the page, the bolt head 312 will be inserted into the hole 324 in the keeper 326, thereby bolting the bolt mechanism 300.

FIG. 1 shows the door 3 closed, latch 20 latched, with the actuator arm 90 rotated anti-clockwise, and bolt mechanism 300 bolted.

FIG. 2 shows the latch 20 in the latched configuration, but with the latch unlocked.

Figure 27:
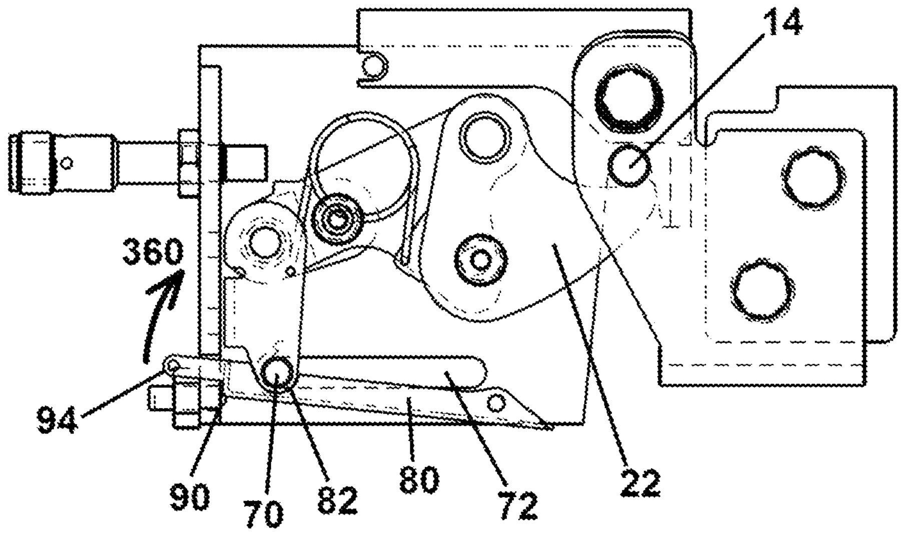
FIG. 27 is a see-through side elevation of the latch assembly of FIG. 2, in a locked and latched configuration.
Figure 28:
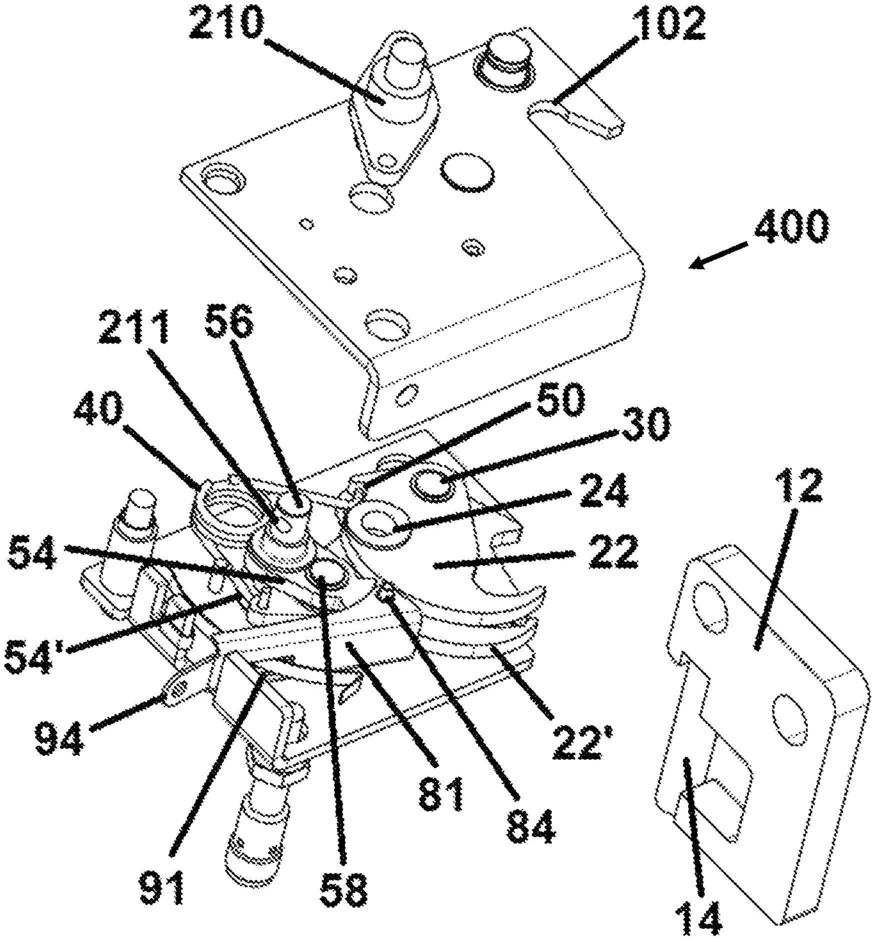
FIG. 28 is see-through isometric view of an alternative latch assembly according to another embodiment of the present invention.

FIG. 27 shows the lock 80 moved to a locked position by lifting the actuation projection 94. In the locked position the pin 70 is nested in the recess 82 and is prevented from movement within the slot 72. The latch 20 is now back in the latch position. When the actuation projection 94 is lowered, the pin 70 will be freed from the recess 82 and be able to move within slot 72 again. The latch 20 will then be unlocked. A ball and spring detent mechanism may act on either side of the lock 80 to keep it in the locked and unlocked position.

Alternative Latch

FIGS. 28 to 32 show an alternative latch 400. Similar parts to the latch 20 are numbered the same, but there may still be some differences as described below. The latch 400 comprises a body 100 formed of plates 100A and 100B with though-holes to allow pins or fasteners to pass through. The body 100 is fastened to the door 3. The body 100 comprises a recess 102 into which the striker pin 14 is able to be received and held captive by a pawl 22. The pawl 22 moves the striker pin 14 into the recess 102 and holds it therein, similarly to latch 20.

The pawl 22 comprises a retaining arm 26 which makes contact with the striker pin 14 and holds it in the recess 102. The arm 26 extends from and is pivotable about a pivot axis 24 formed by the pin 24' (pivot 24), which is fixed relative to the body 100.

The pawl 22 further comprises an actuation pivot 30 formed by pin 30' (pivot 30) to which is pivotally connected a first linkage 50. The first linkage 50 is able to move the pawl actuation pivot 30 relative to the pivot 24, which in turn moves the pawl arm 26. The linkage 50 comprises a thrust arm 32 against which the striker pin 14 may be thrust or the arm 32 can apply thrust to the striker pin 14.

The pawl 22 may comprise a complimentary parallel second plate 22A spaced apart from the first plate. The second plate 22A is also pivotable about the pivot 24 and pivotally connected to the linkage 50 at pivot 30. The linkage 50 may be sandwiched between the first plate and the second plate 22A, which cooperate in their interaction with the striker pin 14.

Linkage 50 is pivotally connected to an actuator linkage 54 at a linkage actuation pivot 58 formed by pin 58' (pivot 58). Linkage 54 pivots about a pivot 56 formed by pin 56' (pivot 56). Linkage 54 is connected to the drive rod 210 by, via connection 211. Thus torque applied to the drive rod 210 rotates the linkage 54 and thus pivot 58 about the pivot 56.

Movement of the actuator linkage 54 is limited to a range of movement by a pin 67 fixed to the body 100, which acts as a stop when recess 65 on linkage 54 is pivoted about pivot 56 and contacts the pin 67. At this end of the range of movement the striker pin 14 is latched by the pawl 22. In an embodiment, the other end of the range of movement is limited by the pawl 22 acting as a stop when a corner adjacent recess 61 on linkage 54 is pivoted about pivot 56 and contacts the pawl 22. Another pin fixed relative to the body 100 could be used instead of the pawl 22. Linkage 54 also controls the scope of movement of the pivot 58 by forming an over-centre mechanism as will be described further below.

Movement of the actuator linkage 54 causes the linkage actuation pivot 58 generally to move towards or away from the pawl's pivot 24, which in turn causes the linkage 50 and thus the pawl 22 to move accordingly. The movement of the pawl to capture the striker pin 14 and latch it in place is similar to that described above with latch 20.

Linkage actuation pivot 58, linkage pivot 56 and pawl actuation pivot 30 are arranged to be aligned when the actuator is at a first transition position near, but not at a latched end of the range of movement. For the majority of the travel of the actuator link 54, a line between the pivot 58 and the pivot 56 is at an obtuse angle with a line between the pivot 30 and the pivot 56. When the actuator link 54 is at the first transition position, a line between the pivot 58 and the pivot 56 is at an angle of 180 degrees to a line between the pivot 30 and the pivot 56. When the actuator link 54 is past the first transition position to where recess 65 engages pin 67 a line between the pivot 58 and the pivot 56 is at a reflex angle with a line between the pivot 30 and the pivot 56. This arrangement provides a first over-centre-mechanism.

Linkage actuation pivot 58, pivot 24 and pawl actuation pivot 30 are arranged to be aligned when the actuator link 54 is at a second transition position near, but not at an opposite unlatched end of the range of movement. For the majority of the travel of the actuator link 54, a line between the pivot 24 and the pivot 58 is at a reflex angle with a line between the pivot 30 and the pivot 24. When the actuator link 54 is at the second transition position, a line between the pivot 58 and the pivot 24 is at an angle of about 180 degrees to a line between the pivot 30 and the pivot 24. When the actuator link 54 is past the second transition position a line between the pivot 58 and the pivot 24 is at an obtuse angle with a line between the pivot 30 and the pivot 24. This arrangement provides a second over-centre-mechanism.

In an embodiment the retaining arm 26 is always in path of striker pin 14 until after the over centre position is passed, enabling both torque on actuator link 54 and movement of striker pin 14 to move the latch into the open over centre position. This interaction between arm 26 and 14 also works in the latching direction, with the purpose that during latching the striker pin 14 is positively contained within the latch before the mechanism goes over centre. In a scenario where the door 3 is closed against a strong wind or gravity, the latch can be pushed over centre by the striker 14, after which the door 3 can briefly open as the door handle now moves relative to the door itself, allowing the striker 14 to slip out of the latch before the latch can engage it. This will leave the latch closed over centre and the door open, constituting a failure of sequencing. This interaction between arm 26 and striker 14 prevents this.

A coil spring 40 is connected to the pawl 22 at connection point 28 and to the linkage 50 at connection point 29. The spring 40 provides a biasing force between the pawl 22 and the linkage 50. The spring 40 is arranged to urge the angle between a line between the pivot 58 and the pivot 56, and a line between the pivot 30 and the pivot 56 to be at the reflex angle when the actuator link 54 is at the end of the range of movement. The spring 40 also urges the angle between a line between the pivot 58 and the pivot 24, and a line between the pivot 30 and the pivot 24 to be at the obtuse angle when the actuator link 54 is at the opposite end of the range of movement. Any latch internal movement from these positions causes the distance between pivots 30 and 58 to become less, up to an over centre point where it increases again towards the other limit position. This shortening of the distance compresses the spring 40. In other words the spring urges the linkage 50 to keep the actuator link 54 in its current position at either the latched position in FIG. 31 or the unlatched position in FIG. 30.

Preferably the radius of the arc of movement of pivot 58 relative to pivot 56 is shorter than the radius of the arc of movement of the pivot relative to the pivot 30.

The actuation arm 90 may be connected to the drive rod 220 and pivot 56 so as to drive the bolt mechanism 300.

Thus movement of the handle 9 causes movement of the linkage 54, this in turn moves the linkage 50, out of the first over centre position and then allows the pawl 22 to pivot so as to release the striker pin 14, and thus unlatch the door 3.

As the door is being closed, the striker pin 14 contacts the thrust arm 32 of the linkage 50, which causes it to move the pivot 30 past the second over centre position and thus allows the linkage 54 to move so as to move the pawl 22 to capture and hold the striker pin 14, and thus latch the door 3.

Figure 32:
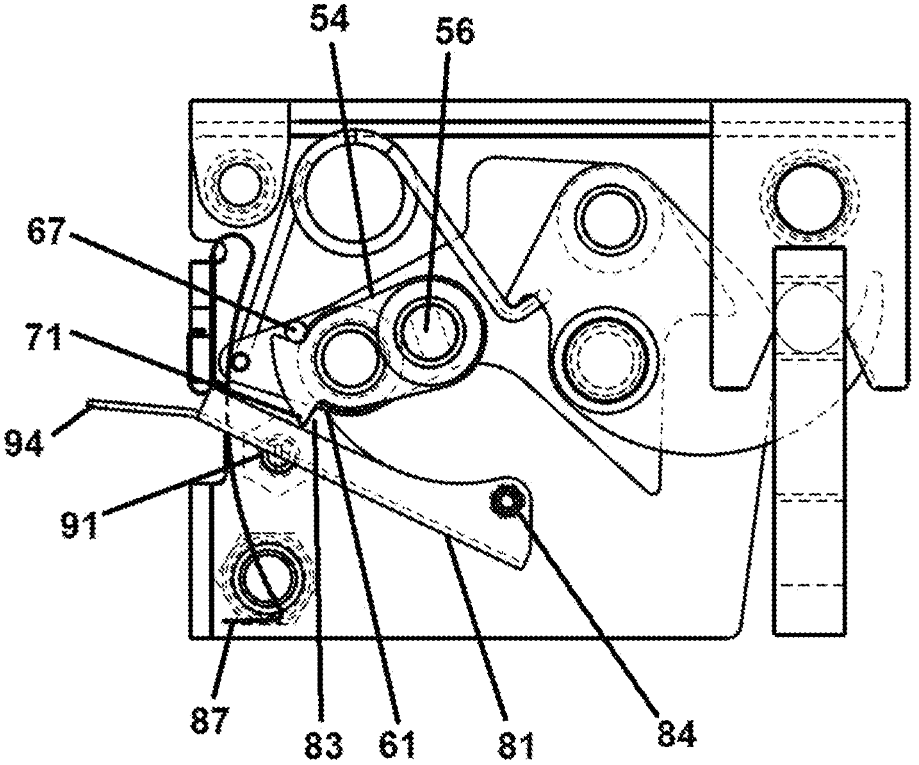
FIG. 32 is a see-through side elevation view of the latch assembly of FIG. 28 where the latch assembly is in a latched and locked configuration.

A lock 81 is pivotally connected at pivot 84 to the body 100. The lock 81 has a recess 83 in the form of a notch able to receive a corner 71 of the linkage 54 distally from the pivot 56 when the linkage 54 is at the latched end of the range of movement, as seen in FIG. 32. When the lock 81 is pivoted to a locking position so that the corner 71 is received in the recess 83, the lock 81 prevents the linkage 54 from movement back towards the unlatched position, thus locking the pawl 22 in the latched position. When the lock 81 is moved to an unlocked position so that the corner 71 is free from the recess 83, the linkage 54 is able to move towards the unlatched position, and thus the pawl 22 is not locked in the latched position. The lock 81 has actuation projection 94 for moving the lock 81 between the locked position and the unlocked position.

Figure 29:
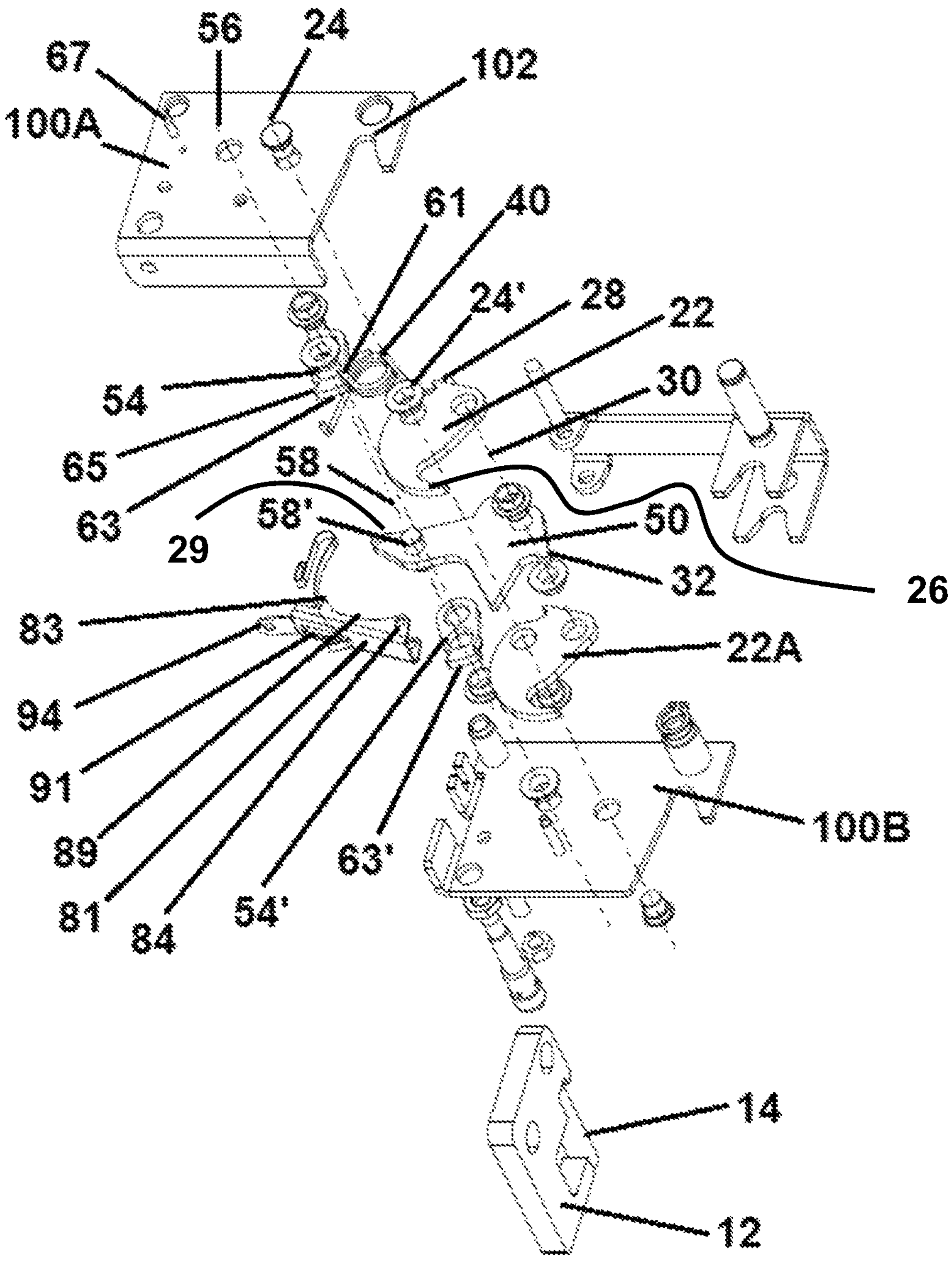
FIG. 29 is an exploded view of the latch assembly of FIG. 28.
Figure 30:
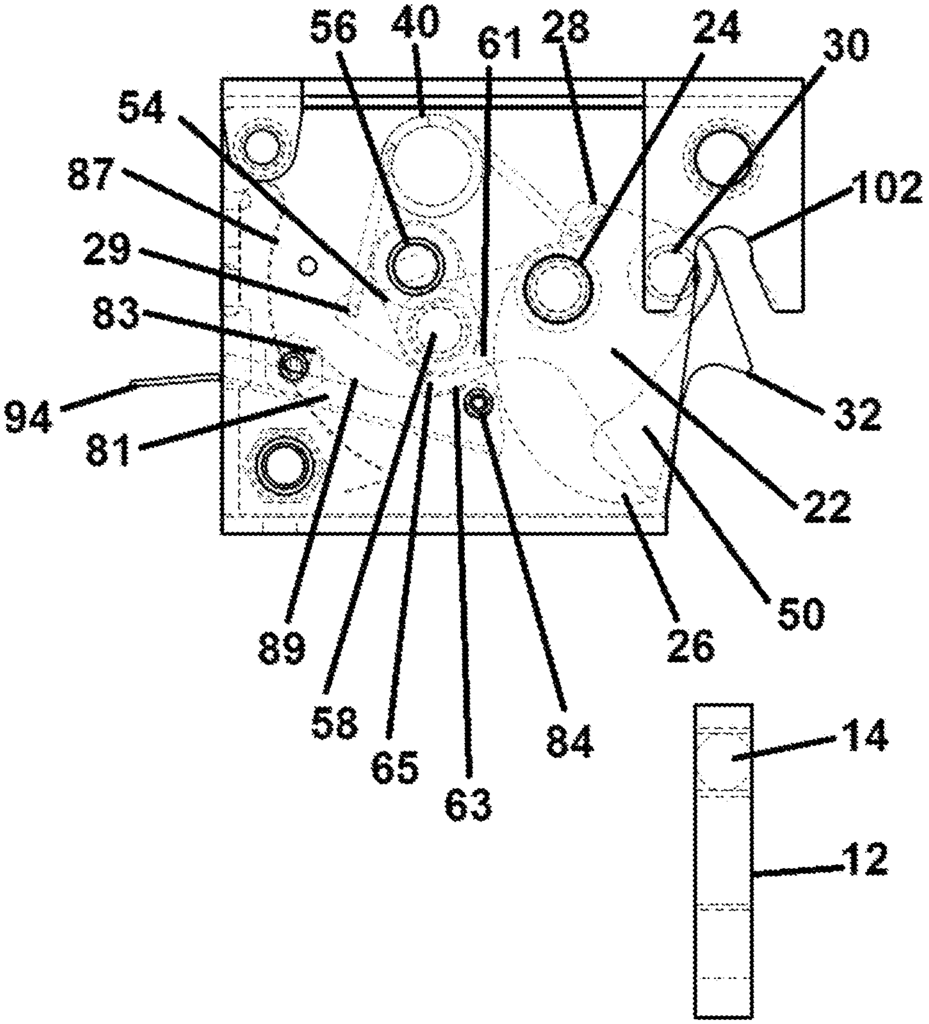
FIG. 30 is a see-through side elevation view of the latch assembly of FIG. 28 where the latch assembly is in an unlatched configuration.
Figure 31:
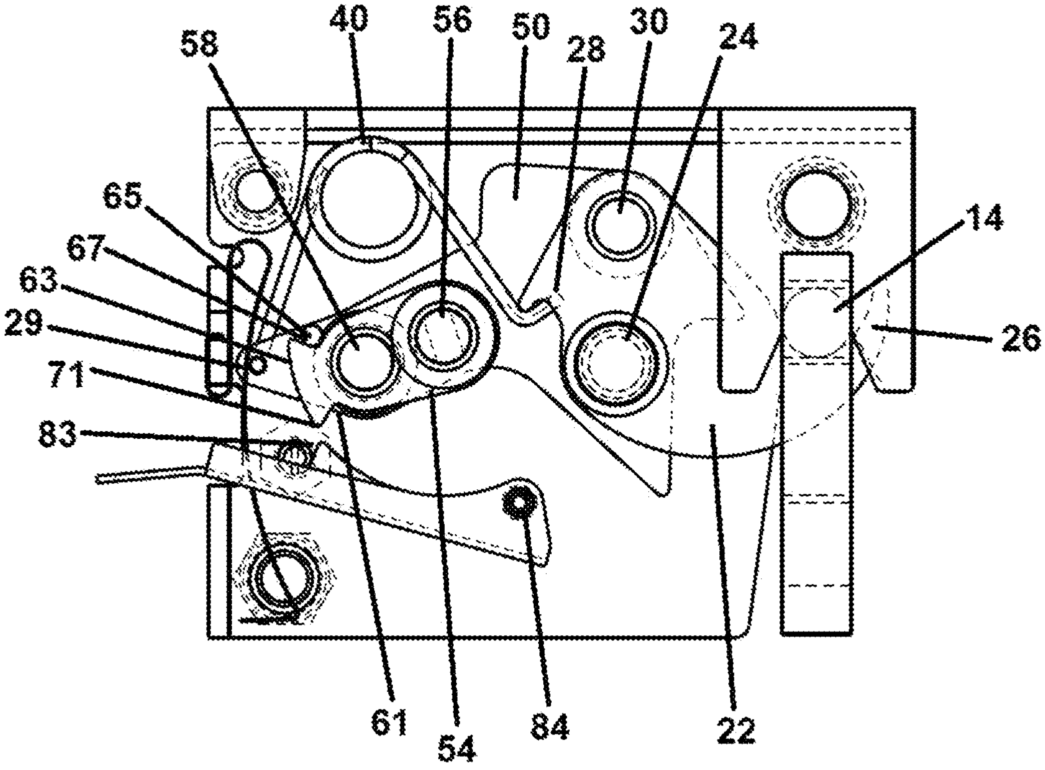
FIG. 31 is a see-through side elevation view of the latch assembly of FIG. 28 where the latch assembly is in a latched configuration.

The linkage 54 has a distal curved end 63. The curved end 63 follows a curve 89 of the lock 81, such that the pivotal position of the lock 81 about pivot 84 is determined by the pivotal position of the linkage 54. Potential interference between end 63 and curve 89 prevents the lock 81 from being pushed into the locked position without the latch being in the latched and over centre position. This is important for sequencing and as some users might add a sensor to positively relay that the lock is engaged with the latch in the latched position. The unlocked position of lock 81 around pivot 84 is determined by interference of projection 94 with the edge of an opening in body 100B. A ball detent (spring loaded ball in a body) urges lock 81 to stay in its locked and unlocked positions, by pushing up against the edges of 81. The detent acts perpendicular to the movement of 81 and can be seen in FIG. 32 at position 91 and in FIGS. 30 and 31 at position 83. In FIG. 29 the detent mechanism is shown as a small cylinder between the striker and 100B, next to the larger cylindrical proximity sensor. The lock 81 has a hole or slot 91 therethrough, through which passes a leave spring 87 which is connected to the body 100. In an embodiment movement of the protrusion on linkage 50 containing 29 interferes with 87 during latching, and deformation of spring 87 causes its indicator end (bent end at bottom in FIG. 30) to move to the left in FIG. 30. This indicator end moves in front of a hole in 100A, providing a visual indication that the latch is in the latched over centre position. At this point 87 can also be detected by a proximity sensor to indicate this position electronically. This sensor is shown in FIG. 29 next to the detent mechanism and in the lower left hand corner of FIGS. 30 and 31.

Further Alternative Latch

Figure 33:
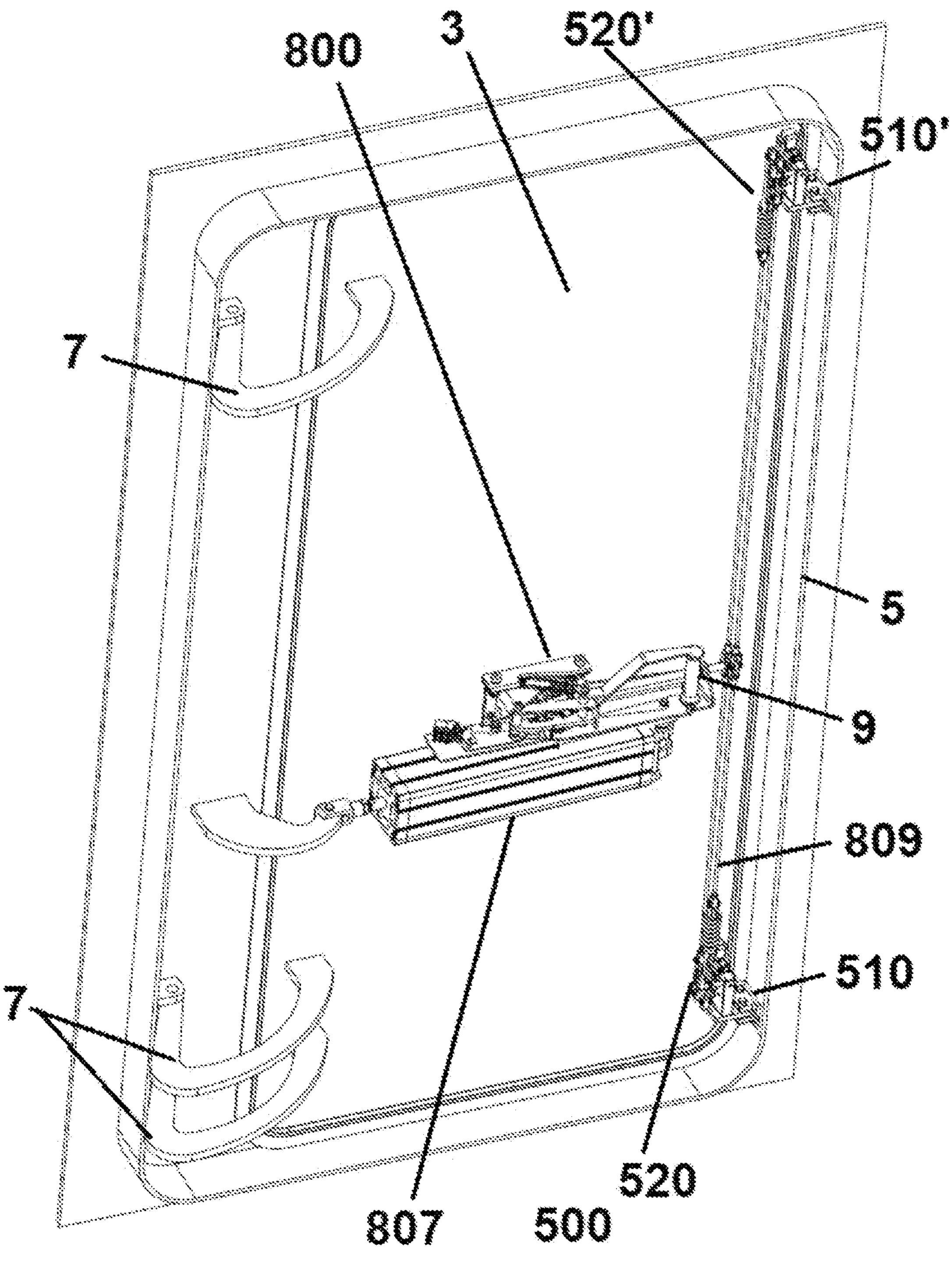
FIG. 33 is a perspective view of a door fitted with an alternative latch assembly according to another embodiment of the present invention.
Figure 34:
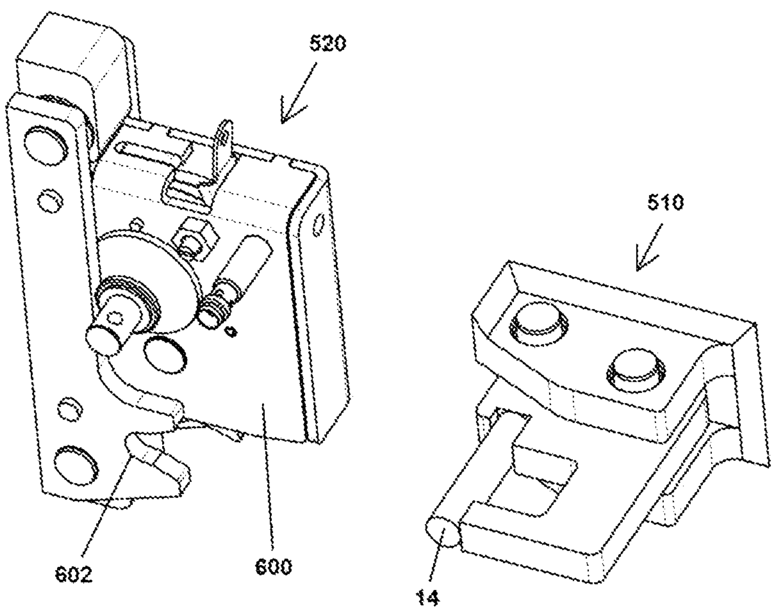
FIG. 34 is an enlarged perspective view of the latch assembly of FIG. 33.
Figure 35:
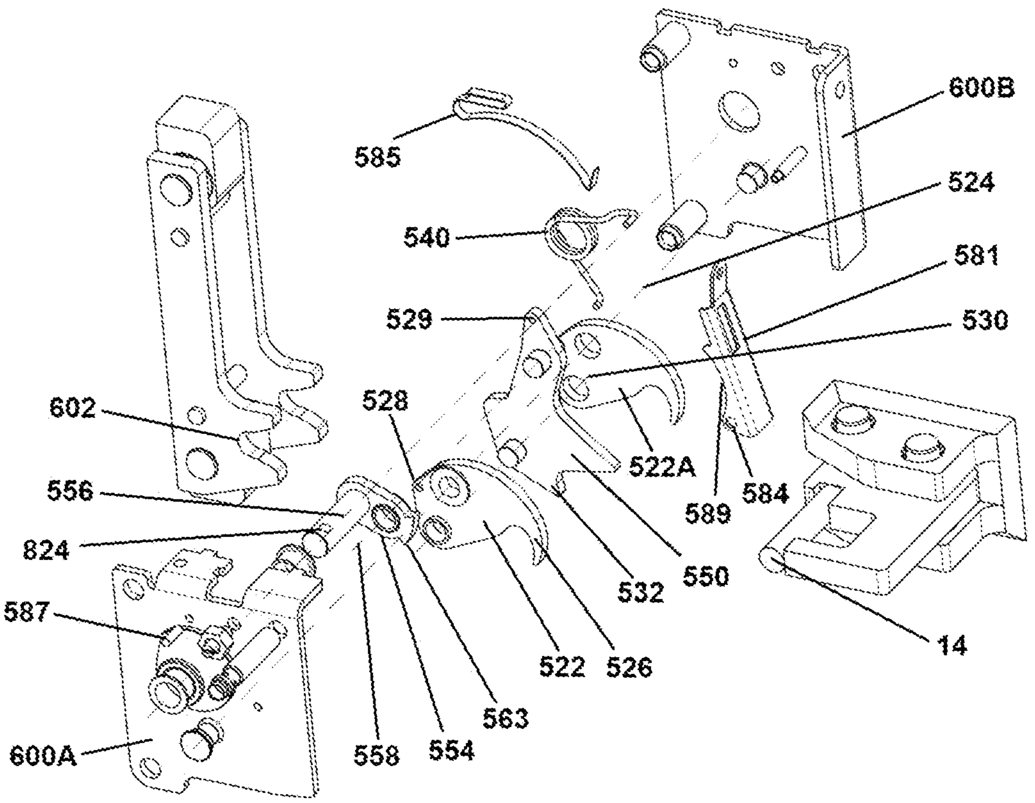
FIG. 35 is an exploded view of the latch assembly of FIG. 34.
Figure 36:
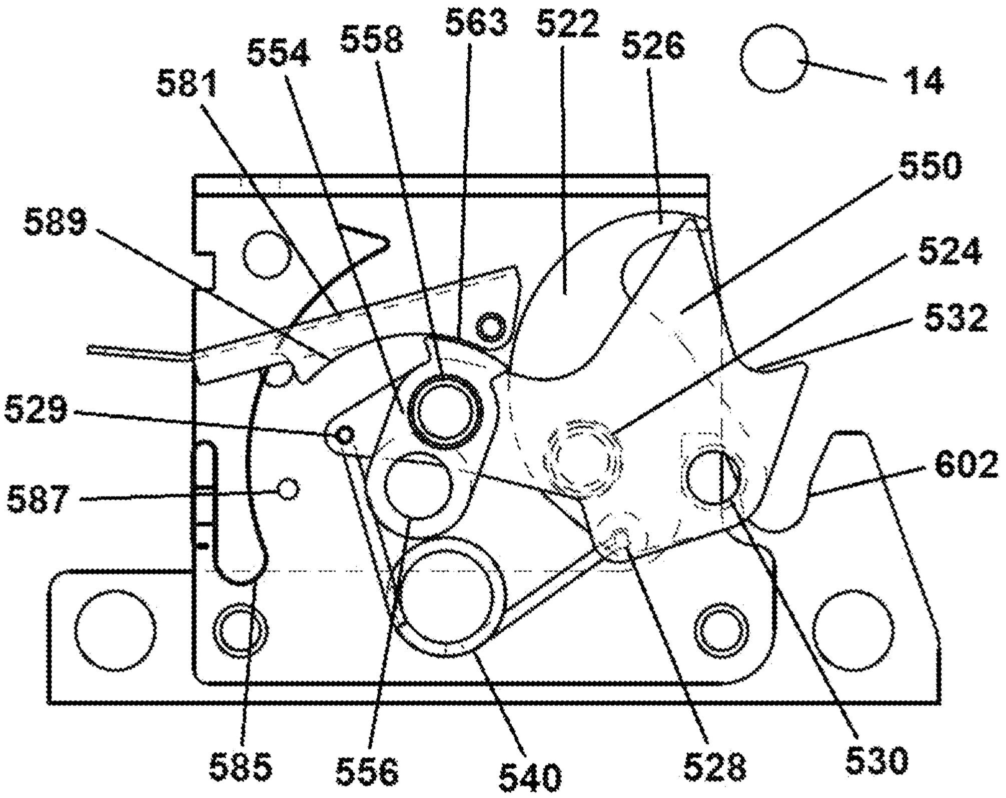
FIG. 36 is a see-through side elevation view of the latch assembly of FIG. 34 in an unlatched, open position.

An embodiment of the latch 520 is described in more detail in relation to FIGS. 34 to 39 as employed in the latching assembly 500 of FIG. 33. The latch 520 comprises a body 600 formed of plates 600A and 600B with through-holes to allow pins to pass through. The body 600 is fastened to the door 3, preferably by using pins or welding. The body 600 comprises a recess 602 into which the striker pin 14 of assembly 510 (which is attached to the door frame 5) is able to be received and held captive by a pawl 522 and optionally a second pawl 522A. The pawl 522 moves the striker pin 14 into the recess 602 and holds it therein so that the door 3 is unable to be opened whilst the striker pin 14 is held by the pawl 522, so that the door 3 is latched.

The pawl 522 comprises a retaining arm 526, which may be generally hook shaped, and which makes contact with the striker pin 14 and holds it in the recess 602. The pawl 522 is pivotable about a pivot axis 524 formed by the pin extending from the body 600, and thus the position of the pivot 524 is fixed relative to the door 3.

The pawl 522 further comprises an actuation pivot 530 formed by (the lower) pin extending from a first linkage 550. Thus the pawl 522 pivots relative to the first linkage 550 about the pivot 530. Pivot 530 is a floating pivot point. The angle between a line between the actuation pivot 530 and the pivot 524 and a line between the pawl arm 526 and the pivot 524 is fixed. The first linkage 550 is able to move the pawl actuation pivot 530 relative to the pivot 524, which in turn moves the pawl arm 526 by the same angular amount because of the fixed angle relationship.

The pawl 522 may comprise a complimentary parallel second plate 522A spaced apart from the first plate 522. The second plate 522A is also pivotable about the pivot 524 and pivotally connected to the linkage 550 at pivot 530. The linkage 550 may be sandwiched between the first plate 522 and the second plate 522A, which cooperate in their interaction with the striker pin 14.

Linkage 550 is pivotally connected to an actuator linkage 554 at a linkage actuation pivot 558 formed by (the upper) pin extending from the first linkage 550. Linkage 550 is connected to a drive rod system 809 (described further below) via a rod 824. Linkage 554 is pivotable about a pivot 556 formed by the rod 824 being rotatable within a receiving hole in body 600. This pivot 556 is fixed in relation to the body 600 (and thus the door 3) and pivot 554 is floating. Torque applied by the drive rod 824 rotates the linkage 554 and thus pivot 558 about the pivot 556.

Linkage 550 comprises a thrust arm 532 against which the striker pin 14 may be thrust or the arm 521 can apply thrust to the striker pin 14.

Movement of the actuator linkage 554 is limited to a range of movement by a pin 587 fixed to the body 600, which acts as a stop preventing further pivoting of the linkage 554 about pivot 556. At this end of the range of movement the striker pin 14 is latched by the pawl 522. In an embodiment, there may be another end of the range of movement which is limited by the pawl 522 acting as a stop by it contacting the linkage 554. Linkage 554 also controls the scope of movement of the pivot 558 by forming an over-centre mechanism as will be described further below.

Movement of the actuator linkage 554 causes the linkage actuation pivot 558 generally to move towards or away from the pawl's pivot 530, which in turn causes the linkage 550 and thus the pawl 522 to move accordingly.

Figure 37:
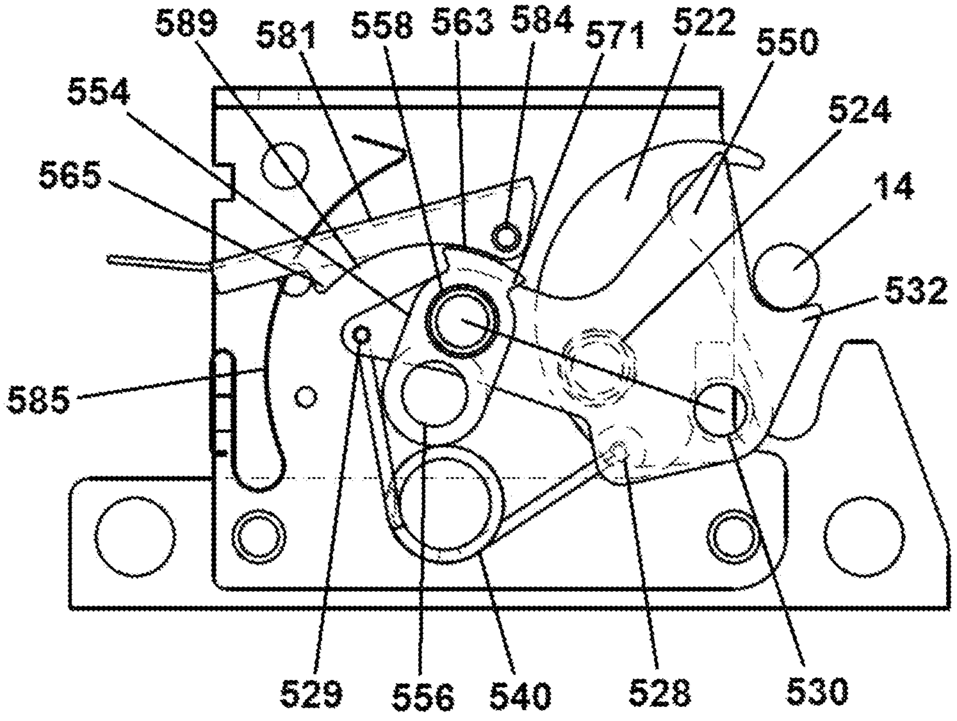
FIG. 37 is a see-through side elevation view of the latch assembly of FIG. 34 in an unlatched, open position with a striker pin contacting and having moved a pawl.

Linkage actuation pivot 558, linkage pivot 530 and pawl pivot 524 are arranged to be aligned when the pawl 522 has rotated slightly off its end of range of movement in an unlatched position, as seen in FIG. 37. Note the pawl 522 have rotated clockwise slightly in comparison to its position in FIG. 36. Generally this is caused by the striker pin 14 contacting the arm. 532 of the linkage 550 causing it to make this part rotation. This in turn causes pivot 524 to be slightly higher in FIG. 37 than in FIG. 36, which in turn causes counter clockwise rotation of linkage 554. This moves the pivots 558, 524 and 530 from the over centre alignment of FIG. 36 to be in alignment in FIG. 37. This arrangement provides a first over-centre mechanism.

Coil spring 540 is connected to the pawl 522 and the linkage 550 at respective connection points 529 and 528, and urges relative movement of the pawl 522 and the linkage 550 towards the end of the range of movement, that is so that the pivots 558, 524 and 530 are urged to the over centre alignment position. Thus, to move the pivots 558, 524 and 530 from the over centre alignment to be in alignment the biasing force of the spring 540 must be overcome.

Figure 38:
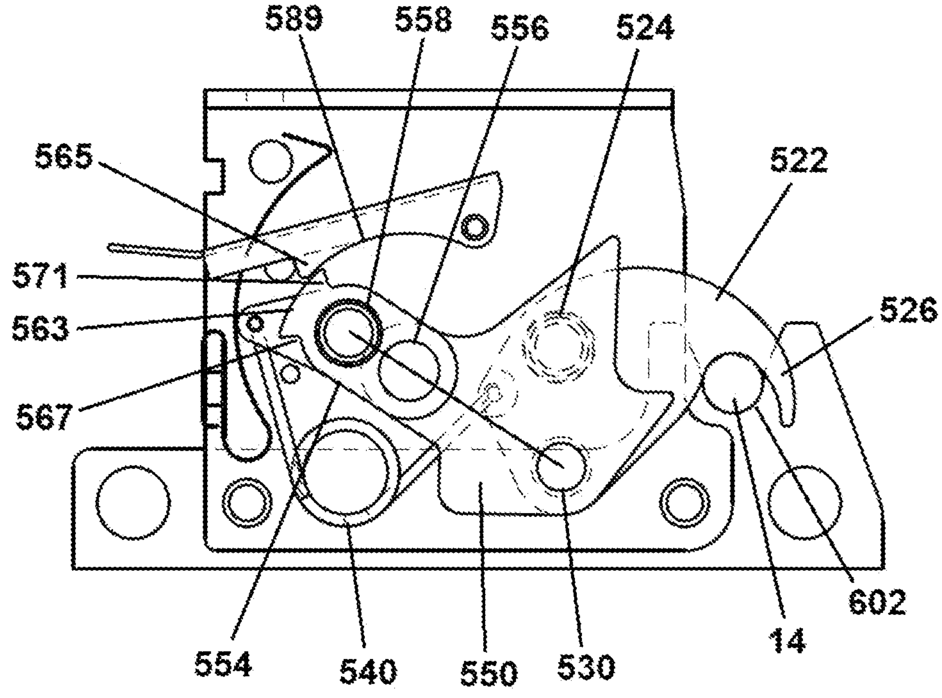
FIG. 38 is a sec-through side elevation view of the latch assembly of FIG. 34 in a closed position with a striker pin captured by a pawl.

The linkage 554 is in a transition position in FIG. 37. Additional rotation of the linkage 554 moves the pivots 558, 524 and 530 from being aligned to a before alignment configuration. Furthermore, movement of pivot 558 in turn moves the linkage 550 (to pivot about pivot 530), which in turn moves pivot 530 and in turn causes the pawl 522 to rotate about pivot 524. This causes the arm 526 to capture the striker pin 14, forcing it into the recess 602 as shown in FIG. 38.

Linkage actuation pivot 558, pivot 556 and pawl actuation pivot 530 are arranged to be aligned when the linkage 554 is at a second transition position near, but not at the end of the range of movement. When the linkage 554 is at the second transition position, a line between the pivot 558 and the pivot 556 is at an angle of about 180 degrees to a line between the pivot 530 and the pivot 556, that is they are aligned, as shown in FIG. 38. When the linkage 554 is past the second transition position, including when at the end of the range of movement when in contact with stop 587 a line between the pivot 558 and the pivot 556 is at an obtuse angle with a line between the pivot 530 and the pivot 556, that is, they are out of alignment in an over centre alignment position. This arrangement provides a second over-centre-mechanism.

In an embodiment the retaining arm 526 is always in path of striker pin 14 until after the opening over centre position is passed, enabling both torque on actuator link 554 and movement of striker pin 14 to move the latch into the open over centre position. This interaction between arm 526 and striker pin 14 also works in the latching direction, with the purpose that during latching the striker pin 14 is positively contained within the latch before the mechanism goes over centre. In a scenario where the door 3 is closed against a strong wind or gravity, the latch can be pushed over centre by the striker pin 14, after which the door 3 can briefly open as the door handle now moves relative to the door itself, allowing the striker pin 14 to slip out of the latch before the latch can engage it. This will leave the latch closed over centre and the door open, constituting a failure of sequencing. This interaction between arm 526 and striker 14 prevents this sequencing failure.

The coil spring 540 and door seal pressure acting through striker 14 onto arm 526 also acts as biasing forces between the pawl 522 and the linkage 550 in the latched position. The spring 540 is arranged to urge the linkage 554 to remain in the position over the over-centre arrangement of FIG. 39. Any latch internal movement from the respective over-centre positions causes the distance between pivots connection point 528 and connection point 529 to become less, up to an over centre point where it increases again towards the other limit position. This shortening of the distance compresses the spring 540. In other words, the spring urges the linkage 550 to keep in its current position at either the latched position in FIG. 39 or the unlatched position in FIG. 36.

Figure 39:
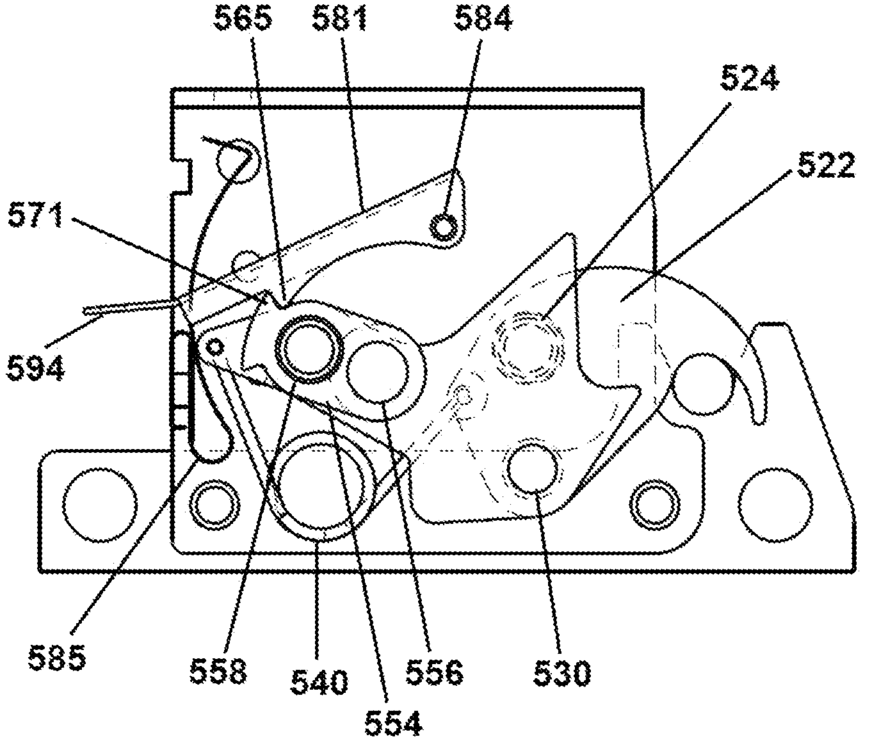
FIG. 39 is a see-through side elevation view of the latch assembly of FIG. 34 in a latched, closed position with a striker pin captured by the pawl and locked.

A lock 581 is pivotally connected at pivot 584 to the body 600. The lock 581 has a recess formed by a protrusion 565 to receive a corner 571 of the linkage 554 distally from the pivot 556 when the linkage 554 is at the latched end of the range of movement, as seen in FIG. 39. When the lock 581 is pivoted to a locking position so that the corner 571 is received in the recess, the lock 581 prevents the linkage 554 from movement hack towards the unlatched position, thus locking the pawl 522 in the latched position. When the lock 581 is moved to an unlocked position so that the corner 571 is free from the recess, the linkage 554 is able to move towards the unlatched position, and thus the pawl 522 is not locked in the latched position. The lock 581 has actuation projection 594 for moving the lock 581 between the locked position and the unlocked position.

The linkage 554 has a distal convex curved end 563 which follows a concave curve 589 of the lock 581, such that the pivotal position of the lock 581 about pivot 584 is determined by the pivotal position of the linkage 554. This prevents the lock 581 from being pushed into the locked position without the latch being in the latched and over centre position. This is important for sequencing and as a sensor may be used to positively relay that the lock is engaged with the latch in the latched position. The unlocked position of lock 581 around pivot 584 is determined by interference of projection 594 with the edge of an opening in body 600. A ball detent (spring loaded ball in a body) urges lock 581 to stay in its locked and unlocked positions, by pushing up against the edges of the lock 581. The detent acts perpendicular to the movement of the lock 581. The lock 581 has a slot therethrough, through which passes a leave spring 585 which is connected to the body 600. In an embodiment movement of a protrusion on linkage 550, at which the spring 540 is connected, interferes with spring 585 during latching, and deformation of spring 585 causes an indicator to move in line with a hole in the body 600, providing a visual indication that the latch is in the latched over centre position. At this point spring 585 can also be detected by a proximity sensor to indicate this position electronically.

Figure 40:
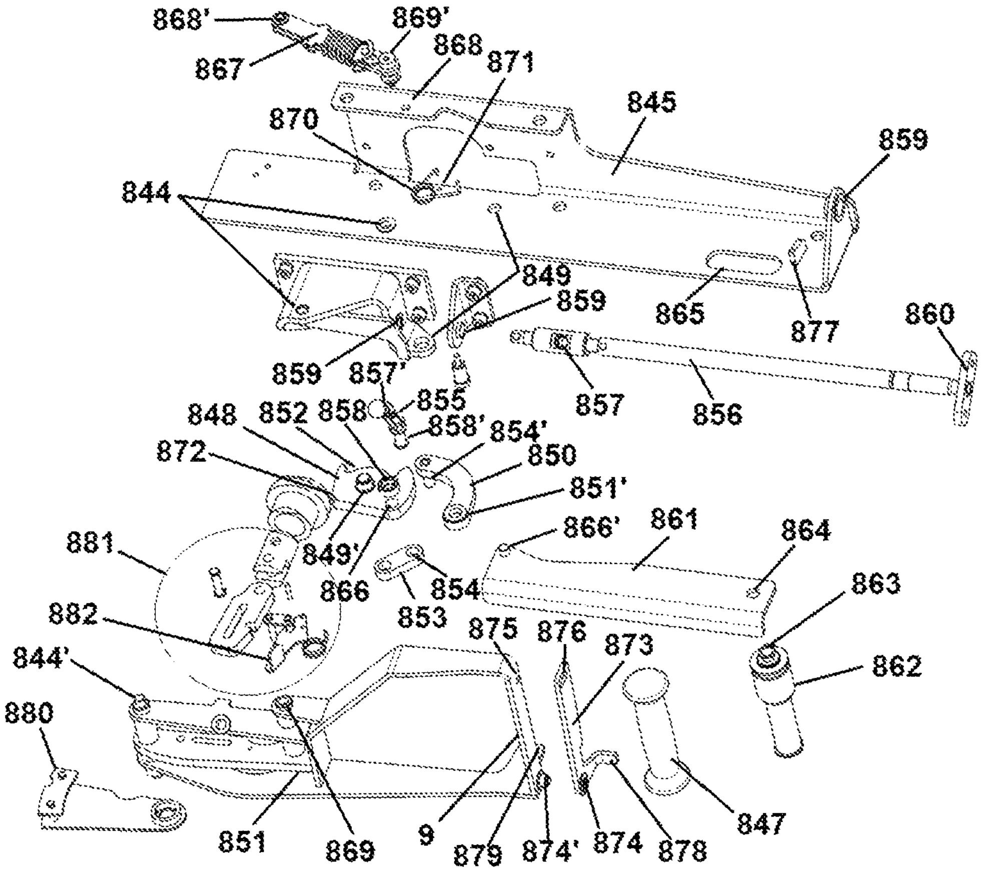
FIG. 40 is an exploded view of an actuation mechanism of FIG. 33.

FIG. 40 shows an alternative handle assemble. The handle assembly comprises:

- body plate 845, to which all components are mounted;
- door mount plates 846, to which the body plate 845 is mounted via screws. The door mount plates are welded to the door;
- handle 9, which is a welded assembly;
- handle grip 847;
- cam plate 848;
- handle link 850, which connects handle 9 to cam plate 848 via slot 852 and cam arm 853;
- cam arm 853;
- universal joint 855;
- actuator bar 856;
- optional linear actuator link 861 and linear actuator spindle 862;
- handle stop 867;
- over centre spring 870;
- lever 873;
- optional pneumatic valve override cam 880; and
- optional external handle connecting mechanism 881.

The handle 9 swivels around pivot 844 via spindle 844'. Cam plate 848 swivels around pivot 849 via pin 849'. Handle link 850 swivels around pivot 851 via pin 851'. Cam arm 853 swivels around pivot 849. Cam arm 853 is connected to handle link 850 at pin 854'. Cam arm 853 ensures pin 854' is always engaged in open slot 852. Universal joint 855 connects cam plate 848 to actuator bar 856. Universal joint 855 swivels around pivot 857 via pin 857'. Universal joint 855 swivels around pivot 858 via pin 858'. Actuator bar 856 swivels in pivot 859. Actuator bar 856 contains arm 860 that connects to drive rod system 809. Rotation of actuator bar 856 in pivot 859 causes linear movement of the rods in rod system 809, which in turn actuates the latch 520.

Arm 860 can be connected to two rod systems 809, one above and one below the actuation mechanism. Linear actuator link 861 swivels around pivot 866 in cam plate 848 via pin 866'. A protrusion 863 on linear actuator spindle 862 is contained within slot 865 in body plate 845, guiding and limiting relative movement between the optional linear door actuator and the actuation mechanism. Linear actuator spindle 862 is connected to linear actuator link 861 by protrusion 863 locating in 864. Handle stop 867 limits the movement of handle 9 away from the door 3. It also returns handle 9 to a neutral position after use. Handle stop 867 swivels around pivot 868 via pin 868'. Handle stop 867 swivels around pivot 869 via pin 869'. Handle 9 contains a protrusion 879 which can interfere with body plate 845. This limits the movement of handle 9 towards the door 3, in order to protect the operator's hand.

Over centre spring 870 urges cam plate 848 to either end of its rotary movement. During unlatching it also urges the cam plate 848 towards the fully unlatched position as the handle 9 rotates cam plate 848 only partially towards the fully unlatched position. Over centre spring 870 is connected to body plate 845 at 871 and to cam plate 848 at 872. Lever 873 swivels around pivot 874 via pin 874', limited in movement by 875 connected to slot 876. Lever 873 is contained within handle grip 847 so that it can only be accessed from the side facing the door 3 inner surface. Lever 873 is positioned so that it will be depressed when the handle grip 847 is gripped. Lever 873 contains a protrusion 878 that can interfere with tab 877 on body plate 845. Lever 873 is spring loaded to return it to the interfered position when the grip is released. This interference prevents unintentional unlatching of the door 3, typically when an object falls against the handle.

When the handle grip 847 is clasped by hand lever 873 in depressed, releasing the interference between 878 and 877, allowing the door 3 to be unlatched. Pneumatic valve overide cam 880 allows for automatic manual override in case of powered operation failure by opening the pneumatic circuit when handle 9 is moved in either direction. External handle connecting mechanism 881 allows for an external door handle to be connected to actuation mechanism. This connection can be disengaged for safety reasons from the inside by flicking lever 882.

The rod actuation system 809 comprises: unlatching rod 888; latching rod 893; actuation arm 889; and overload protection spring 902.

Actuation arm 889 is connected to latch 520 via 824, and pivots together with actuator linkage 554. Pin 891 of actuation arm 889 is contained in slot 892, which forms part of unlatching rod 888. Pin 895 of actuation arm 889 is contained in a short slot in rod plate 896.

Unlatching and Opening the Door

FIG. 33 show the door 3 closed and latched (with the actuation mechanism 800 in the latched condition, the rod system 809 in the latched condition and the latch 210 in the latched condition). This is the state when unlatching and opening starts.

Manual Operation of Actuation Mechanism

Figure 42:
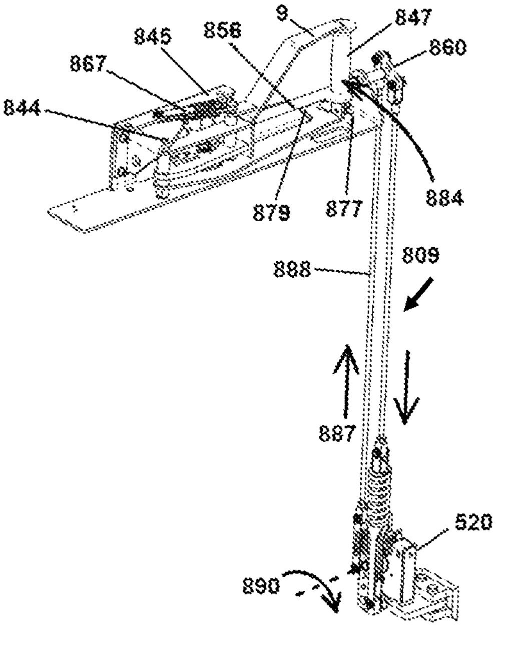
FIG. 42 is an enlarged view of the latch assembly, illustrating the unlatching operation via the handle.
Figure 43:
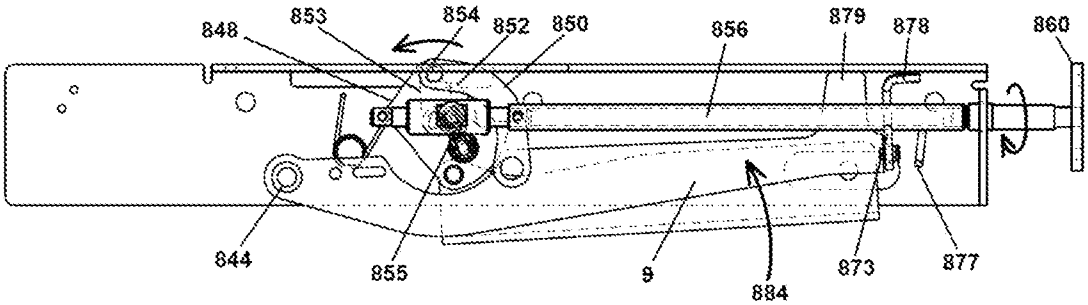
FIG. 43 is a see-through plan view of the actuation mechanism, illustrating the unlatching operation first stage via the handle.
Figure 44:
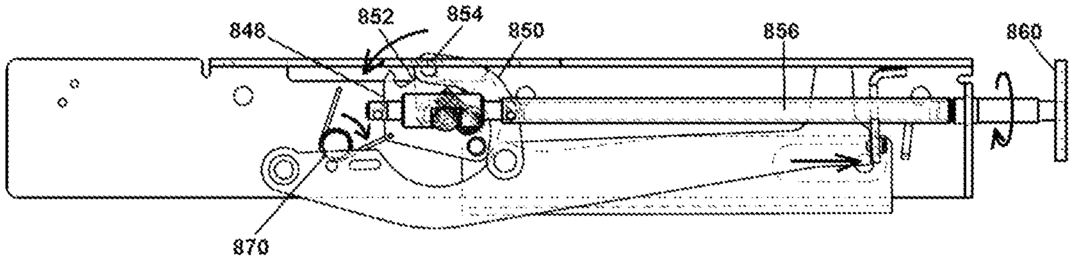
FIG. 44 is a see-through plan view of the actuation mechanism, illustrating the unlatching operation second stage via the handle.

FIGS. 42 through 44 illustrates this process. To unlatch and open the door, a person pushes on the handle 9 as indicated by arrow 884. By gripping the handle grip 847, the lever 873 is depressed, removing the interference between 878 and 877. This allows anti-clockwise rotation of handle 9 about pivot 844.

Rotation of handle 9 causes handle link 850 to move pin 854' in slot 852, contained by cam arm 853. This causes cam plate 848 to rotate anti-clockwise. The handle movement is stopped by interference of protrusion 879 with body plate 845. At this point over centre spring 870 is already past its over centre position, and urges the cam plate 848 to continue rotating anti-clockwise as seen in FIG. 44.

This spring force combined with the latch 210 being forced towards the unlatched position during door opening, ensures the cam plate moves to the fully unlatched position. This latch movement is described later in more detail.

Rotation of cam plate 848 causes actuator bar 856 to rotate via the universal joint 855. Rotation of actuator bar 856 and arm 860 causes linear movement of the rods in rod system 809, which in turn unlatches the latch 210. This rod movement is described later in more detail.

After unlatching further movement of handle 9 as indicated by arrow 884 causes the door 3 to swing open about its hinges 7.

When the person releases the handle 9, the spring loaded handle stop 867 returns the handle 9 to the neutral position. The lever 873 is spring loaded and returns to the neutral position, again causing interference between 878 and 877 to prevent unintended unlatching.

Powered Operation of Actuation Mechanism

Figure 45:
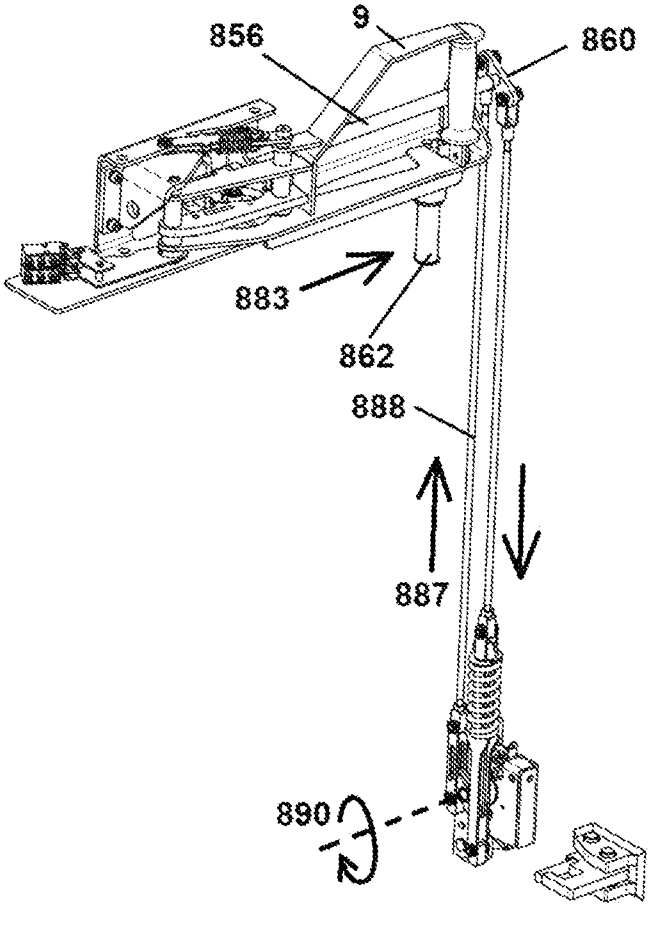
FIG. 45 is an enlarged view of the latch assembly, illustrating the powered unlatching operation.
Figure 46:
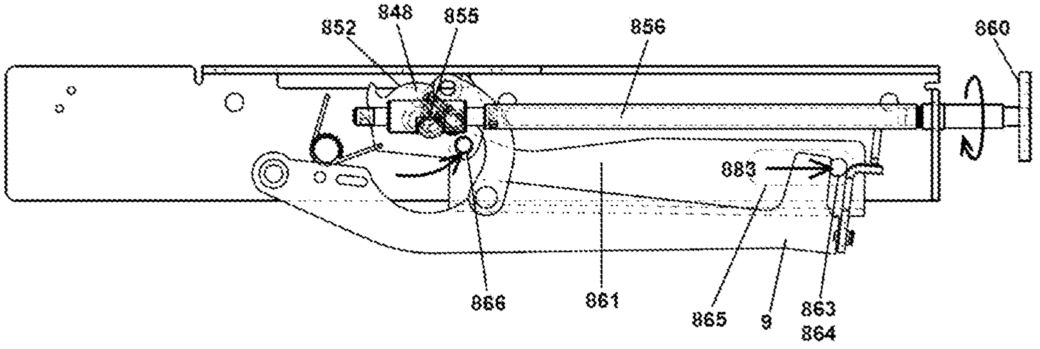
FIG. 46 is a see-through plan view of the actuation mechanism, illustrating the powered unlatching operation.

FIGS. 45 and 46 illustrates this process. To unlatch and open the door, the linear actuator 807 moves the linear actuator spindle 862 as indicated by arrow 883. This movement is guided by slot 865. The movement of actuator spindle 862 is transferred to actuator link 861 through connection of 863 and 864, which in turn causes cam plate 848 to rotate anti-clockwise through connection 866. When actuator spindle 862 reaches the end of slot 865, cam plate 848 is at the fully unlatched position.

Rotation of cam plate 848 causes unlatching of latch 210 as described above. After unlatching further movement of linear actuator 807 as indicated by arrow 883 causes the door 3 to swing open about its hinges 7. The arc of slot 852 allows the handle 9 to remain stationary in the neutral position during powered unlatching and opening.

Emergency Manual Operation of Actuation Mechanism of Powered Door

Figure 47:
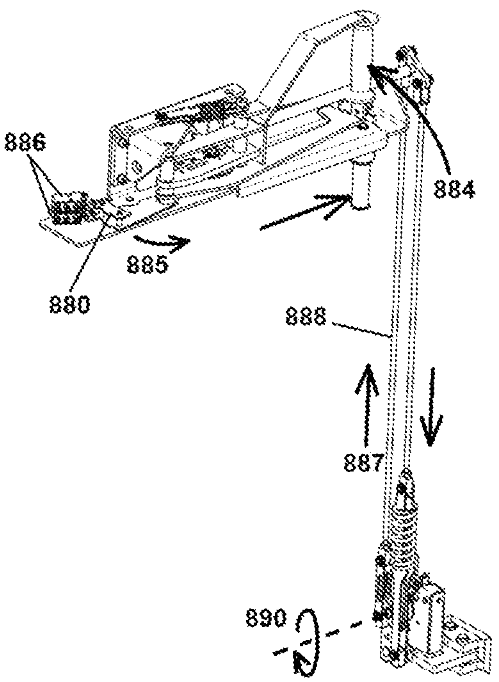
FIG. 47 is an enlarged view of the latch assembly, illustrating the manual override unlatching operation of a powered door.
Figure 48:
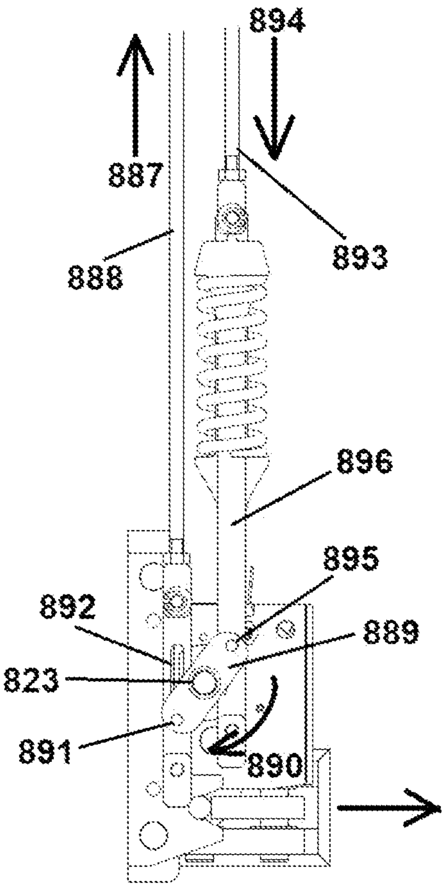
FIG. 48 is a side elevation view of the rod mechanism, illustrating the unhitching operation.

In the event of a failure of the linear actuation of a powered door, the door can be opened manually as described above. No additional actions are required. The pneumatic valve override cam 880 is connected to handle 9, causing it to swivel with the handle as indicated by arrow 885. The pneumatic valve override cam 880 has a cam profile that acts on the manual actuation levers of pneumatic valves 886 causing them to open both ports of pneumatic linear actuator 807, thereby allowing the linear actuator 807 to be extended by the movement of the door 3. FIG. 47 illustrates this process.

Rod System Operation

FIGS. 42, 45, 47 and 48 illustrate this process. Rotation of arm 860 causes linear movement of unlatching rod 888 away from latch 210, as indicated by arrow 887.

Movement of unlatching rod 888 in direction of arrow 887 causes actuation arm 889 to rotate clockwise as indicated by arrow 890, via interference of pin 891 in slot 892. As actuation arm 889 is connected to actuator link 554 via 824, clockwise rotation of actuation arm 889 causes unlatching of latch 210. This process is described later in more detail.

Rotation of arm 860 causes linear movement of latching rod 893 as indicated by arrow 894. This sympathetic movement has no influence on the unlatching process due to a loose fit between pin 895 and rod plate 896.

Latch Operation

Figure 49:
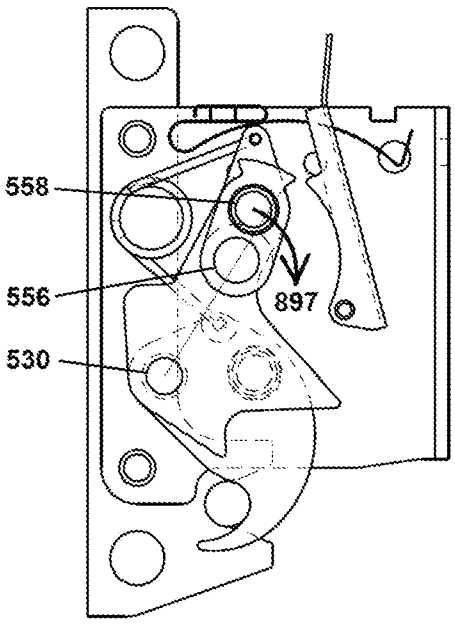
FIG. 49 is a see-through side elevation view of the latch assembly of FIG. 33, in commencement of the unlatching process.
Figure 50:
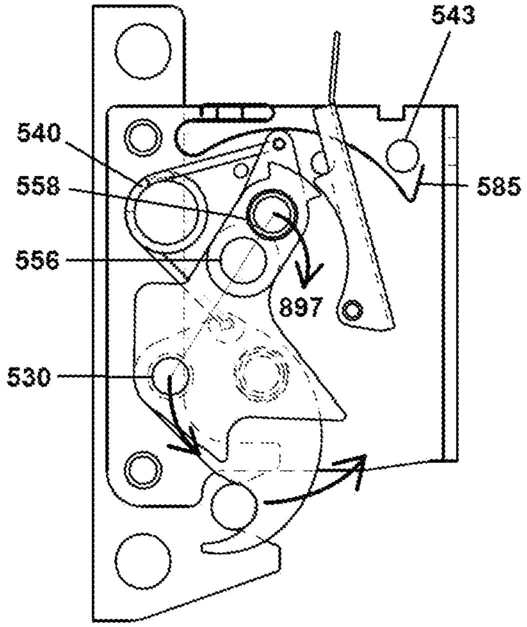
FIG. 50 is a see-through side elevation view of the latch assembly of FIG. 33, in the unlatching process.

To open the door 3, a person pushes on the handle 9 which activates the rod system 809. Rotation of actuation arm 889 causes the linkage 554 to rotate about the pivot 556 as indicated by arrow 897 so that pivots 558, 556 and 530 are moved from the past over-centre position to a top dead centre position where they are aligned, as shown in FIGS. 49 and 50. In doing so the resistance of the spring 540 must be overcome. The spring 540 will urge the pivot 558 hack to the position of FIG. 49. This prevents the latch from inadvertently unlatching.

Figure 51:
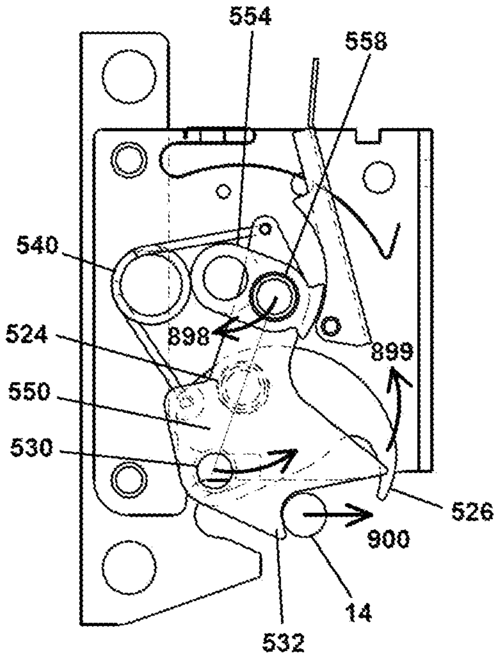
FIG. 51 is a see-through side elevation view of the latch assembly of FIG. 33, further in to the unlatching process.

As shown in FIG. 51, this will result in the continued movement of the linkage 554 which also drives linkage 550 past the pivot 524 so as to cause pivot 530 to rotate in an arc about pivot 524. This rotates the pawl 522 as indicated by arrow 899. This movement of the pawl 522 moves arm 526, which commences release of the striker pin 14. The release of the pin 14 may allow the compressed door seal to resiliently move the striker pin 14 in direction 900 so as to commence movement of the door 3.

Further rotation of actuation arm 889 causes the linkage 554 to rotate further about the pivot 556 as indicated by arrow 898.

As shown in FIG. 51, this will result in the continued movement of the linkage 550. This movement of the linkage 550 moves thrust arm 532 to make contact with the pin 14. With the resilience of the seal released adhesion or a pressure differential between opposite sides of the door 3 may make the door 3 somewhat stuck on the seal. The pressure of the arm thrust 532 on the striker pin 14 will prize the door 3 from the seal, forcing the striker pin 14 to move in the direction indicated by arrow 900. At this point the linkage 554 is near the end of its movement.

When the linkage 554 is near the end of its movement, the pivots 558, 524 and 530 will be aligned, in a top dead centre position, and spring 540 will be tightened as the pivots move to this position.

The spring 540 urges the pawl 522 to continue to rotate as it completes its rotation to the unlatched position. When the pawl 522 is in the unlatched position, the pivot 530 will have rotated out of alignment with pivots 524 and 558 and will be past the top dead centre position in an over-centre position. The corner adjacent recess 561 on linkage 554 contacts the pawl 522 and is prevented from further rotation.

Movement of the pivot 530 hack toward the top dead centre position causes tightening of the spring 540, so the spring 540 is continually urging the pivot 530 to remain in the past over-centre position, which prevents inadvertent movement of the pawl 522, and in particular movement of the arm 526 which could block the striker pin 14 from entering the recess 602.

Figure 52:
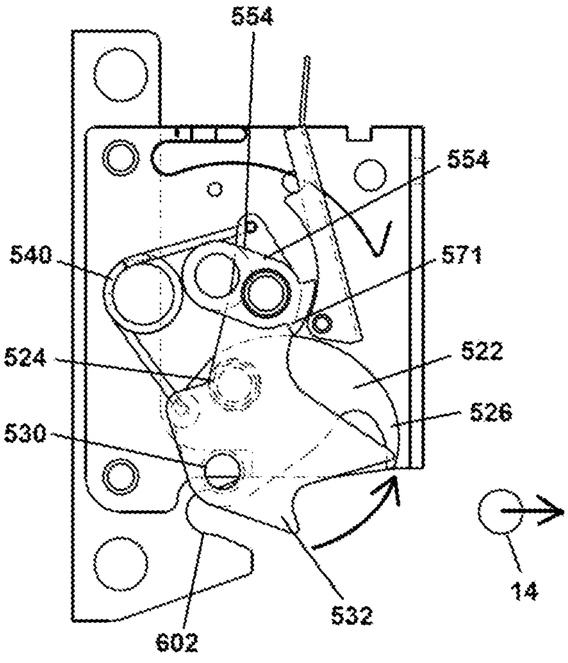
FIG. 52 is a see-through side elevation view of the latch assembly of FIG. 33, in the fully unlatched state.

When the linkage 554 is fully at the unlatched position, it will have caused the linkage 550 to move so that the thrust arm 532 blocks entry into the recess 602 as seen in FIG. 52.

Closing and Latching the Door

Figure 41:
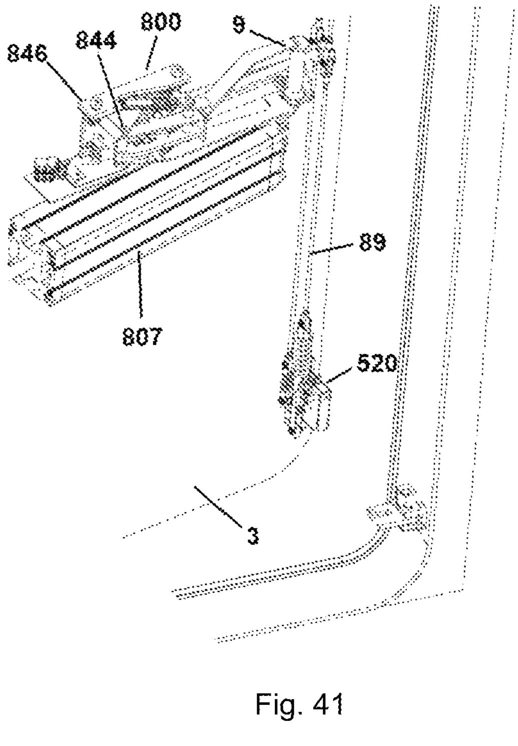
FIG. 41 is an enlarged view of the latch assembly of FIG. 33, in the unlatched and open configuration.

FIG. 41 shows the door 3 unlatched and open (with the actuation mechanism 800 in the unlatched condition, the rod system 809 in the unlatched condition and the latch 210 in the unlatched condition). This is the state when closing and latching starts.

Manual Operation of Actuation Mechanism

Figure 56:
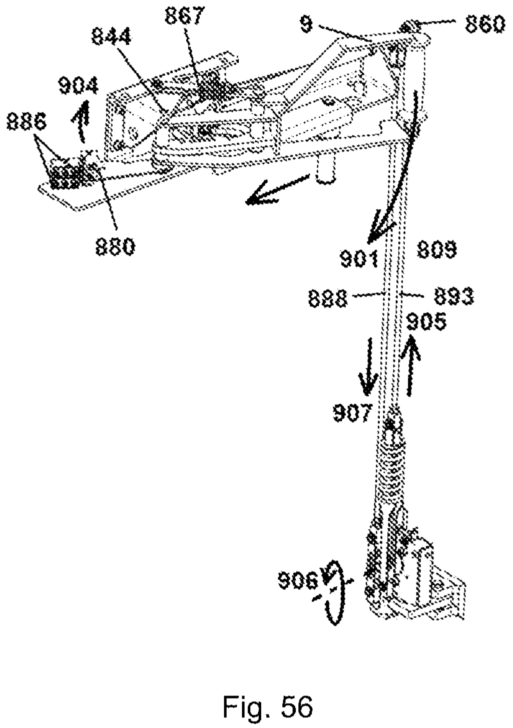
FIG. 56 is an enlarged view of the latch assembly, illustrating the emergency manual latching operation of a powered door.
Figure 57:
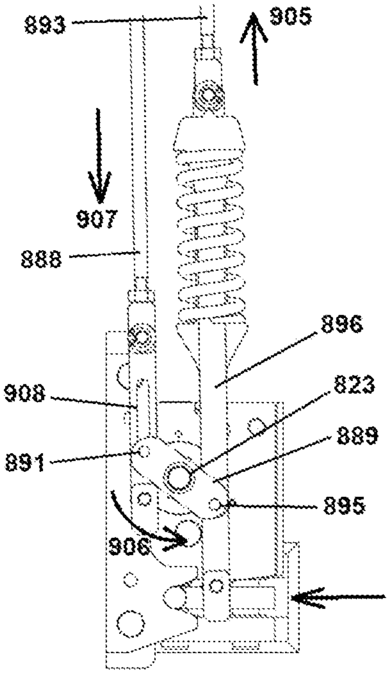
FIG. 57 is a side elevation view of the rod mechanism, illustrating the latching operation.
Figure 59:
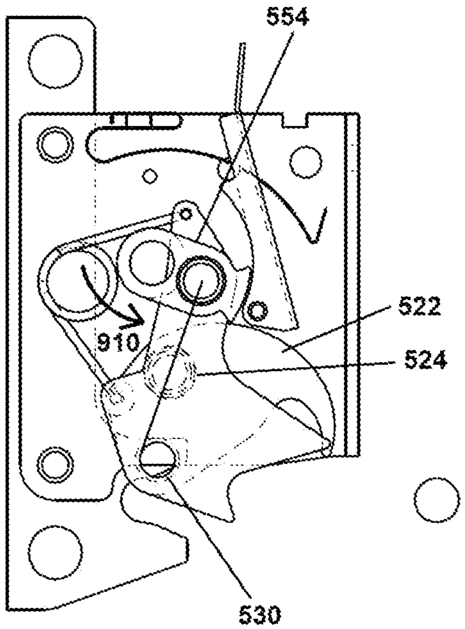
FIG. 59 is a see-through side elevation view of the latch assembly of FIG. 33, in the unlatched position.

FIGS. 56 and 57 illustrate this process. To close and latch the door, a person pulls on the handle 9 as indicated by arrow 901. By gripping the handle grip 847, the lever 873 is depressed, but this has no influence on this operation. As latch 210 is in the unlatched over centre position as illustrated by FIG. 59, the rods in rod system 809 cannot move linearly, therefore arm 860, actuator bar 856, and cam plate 848 cannot rotate. Since pin 854' is at the limit of slot 852, handle link 850 and therefore handle 9 cannot move relative to body plate 845. Any movement of handle 9 in direction of arrow 901 therefore causes the door 3 to swing about its hinges 7 in a closing direction.

However, since rod system 809 contains an overload protection spring 902, movement of handle 9 relative to body plate 845 is possible if spring 902 is compressed. This will typically happen when there is an external resistance to the closing motion of door 3. This overload spring functionality is described later in more detail.

In this situation the rotation of handle 9 is limited by handle stop 867 reaching its extended limit. Any further movement of handle 9 in direction of arrow 901 causes the door 3 to swing about its hinges 7 in a closing direction.

When the door 3 is almost closed, but before the door seal requires maximum force to compress, interference of striker pin 14 with thrust arm 532 in latch 210 causes the latch linkage to go over centre allowing movement of the handle 9 relative to body plate 845 and latching of the door 3. This functionality of latch 21 is described later in more detail.

Since the handle 9 can now move relative to body plate 845, further movement of handle 9 does not cause movement of door 3 about its hinges 7, but instead causes latches 210 (and 210') to latch door 3 closed. The latching process moves the door slightly into its final closed position.

Rotation of handle 9 about 844 causes handle link 850 to move pin 854' in slot 852, contained by cam arm 853. This causes cam plate 848 to rotate clockwise. Rotation of cam plate 848 causes actuator bar 856 to rotate via the universal joint 855. Rotation of actuator bar 856 and arm 860 causes linear movement of the rods in rod system 809, which in turn latches the latch 210. This rod movement is described later in more detail.

The handle movement is stopped by handle stop 867 reaching its extended limit. At this point the latches are in the latched position. At this point over centre spring 870 is past its over centre position, and urges the cam plate 848 to remain in its most clockwise position, urging the actuation mechanism 800 to remain in the latched position.

When the person releases the handle 9, the spring loaded handle stop 867 returns the handle 9 to the neutral position. The lever 873 is spring loaded and returns to the neutral position, again causing interference between 878 and 877 to prevent unintended unlatching. The relative large movement of handle 9 during the latching phase compared with the door movement required to compress the door seal, is used as leverage to lower the handle force required to facilitate seal compression. If the handle 9 has already moved relative to body plate 845 at the point of the latch 210 going over centre, due to compression of overload protection spring 902, the combination of relaxing movement of spring 902 and movement of handle 9 combine to latch the door 3.

Powered Operation of Actuation Mechanism

Figure 54:
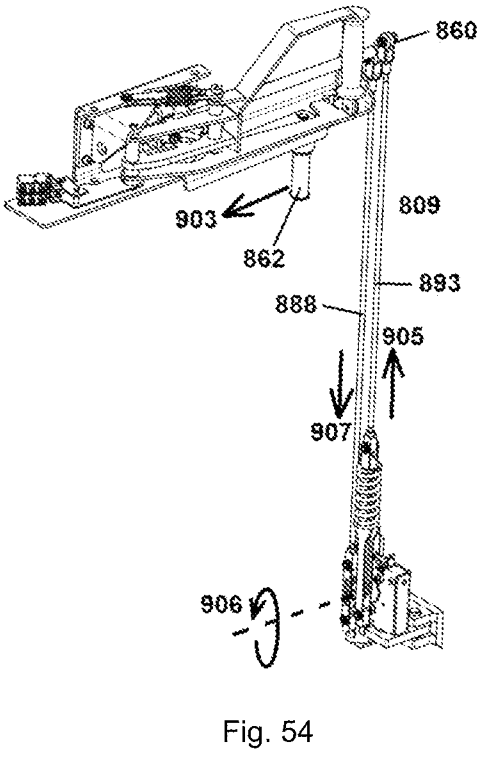
FIG. 54 is an enlarged view of the latch assembly, illustrating the powered latching operation.

FIG. 54 illustrates this process. To close and latch the door, the linear actuator 807 moves the linear actuator spindle 862 as indicated by arrow 903. This movement is guided by slot 865. As latch 210 is in the unlatched over centre position as illustrated by FIG. 27, cam plate 848 cannot rotate as described above. This prevents linear actuator link 861 and therefore actuator spindle 862 from moving relative to body plate 845. Therefore movement of actuator spindle 862 by linear actuator 807 in direction of arrow 903 causes the door 3 to swing about its hinges 7 in a closing direction.

The same exception as described above can occur if spring 902 is compressed. The relative movement of spindle 862 to body plate 845 is limited by slot 865. Any further movement of actuator spindle 862 in direction of arrow 903 causes the door 3 to swing about its hinges 7 in a closing direction.

When the latch linkage goes over centre as described above, movement of the actuator spindle 862 relative to body plate 845 is possible and latching of the door 3 can occur. The movement of actuator spindle 862 in direction of arrow 903 is transferred to actuator link 861 through connection of 863 and 864, which in turn causes cam plate 848 to rotate clockwise through connection 866. When actuator spindle 862 reaches the end of slot 865, cam plate 848 is at the fully latched position. Rotation of cam plate 848 causes latching of latch 210 as described above. The arc of slot 852 allows the handle 9 to remain stationary in the neutral position during powered closing and latching.

Emergency Manual Operation of Actuation Mechanism of Powered Door

In the event of a failure of the linear actuation of a powered door, the door can be closed and latched manually as described above. No additional actions are required.

Figure 55:
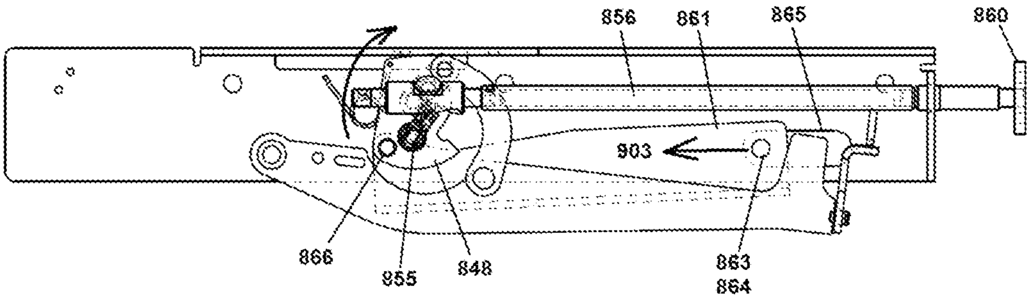
FIG. 55 is a see-through plan view of the actuation mechanism, illustrating the powered latching operation.

The pneumatic valve override cam 880 is connected to handle 9, causing it to swivel with the handle as indicated by arrow 904. The pneumatic valve override cam 880 has a cam profile that acts on the manual actuation levers of pneumatic valves 886 causing them to open both ports of pneumatic linear actuator 807, thereby allowing the linear actuator 807 to be retraced by the movement of the door 3. FIGS. 55 and 56 illustrate this process.

Rod System Operation

Figure 58:
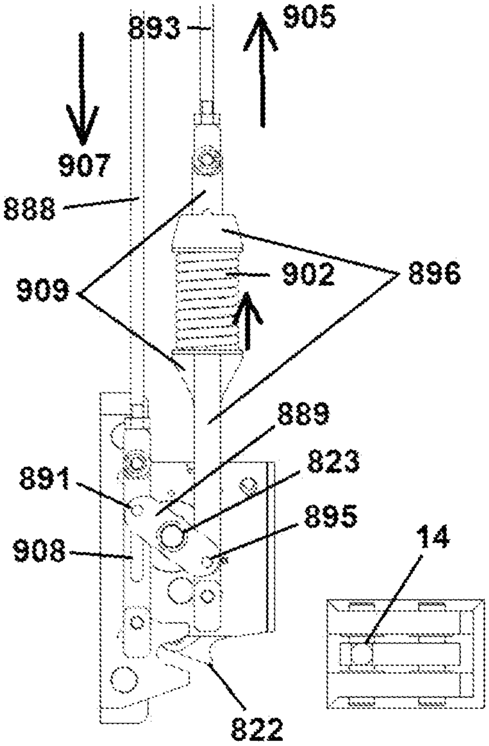
FIG. 58 is a side elevation view of the rod mechanism, illustrating the latch protection spring mechanism.

FIGS. 57 and 58 illustrate this process. Rotation of arm 860 causes linear movement of latching rod 893 away from latch 210, as indicated by arrow 905. Movement of latching rod 893 in direction of arrow 905 causes actuation arm 889 to rotate anti-clockwise as indicated by arrow 906, via connection of pin 895 with rod plate 896. As actuation arm 889 is connected to actuator link 554 via 824, anti-clockwise rotation of actuation arm 889 causes latching of latch 210. This process is described later in more detail.

Rotation of arm 860 causes linear movement of unlatching rod 888 as indicated by arrow 907. This sympathetic movement has no influence on the latching process clue to the connection between pin 891 and rod 888 via groove 908. During operation the following scenario might occur.

An external force might act on door 3 to resist it being closed. The person wanting to close the door might then apply maximum force to the handle 9. As the handle 9 is prevented from movement relative to body plate 845 by the over centre position of the latch, the forces exerted on the components of rod system 809 and latch 210 might exceed their strength rating.

To protect these components, rod system 809 contains an overload protection spring 902. FIG. 58 illustrates the mechanism of the overload protection.

As striker pin 14 has not yet pushed latch 210 over centre via thrust arm 532, actuation arm 889 is prevented from rotating. Usually this will prevent rod 893 from moving in direction of arrow 905, as urged by handle 9.

However, compression of overload protection spring 902 is caused by relative movement of plates 896 and 909, which allows movement of rod 893 in direction of arrow 905, while actuation arm 889 is still in its locked position.

The sympathetic movement of rod 888 in direction of arrow 907 is accommodated by pin 891 sliding in groove 908. When the latch is in a position to be latched, the potential energy in spring 902 moves plate 896 in the direction of arrow 905, which then rotates actuation arm 889 anti-clockwise about 823 via pin 895, causing the door 3 to be latched.

During operation the following scenario might also occur. With a deformed door with inure than one latch, one latch might be in a position where the striker pin 14 has already pushed it over centre and ready for latching, while the other latches are still in the over centre unlatched position. The above described mechanism will then allow for one latch to partially secure the door while the others are still unlatched

Latch Operation

Figure 53:
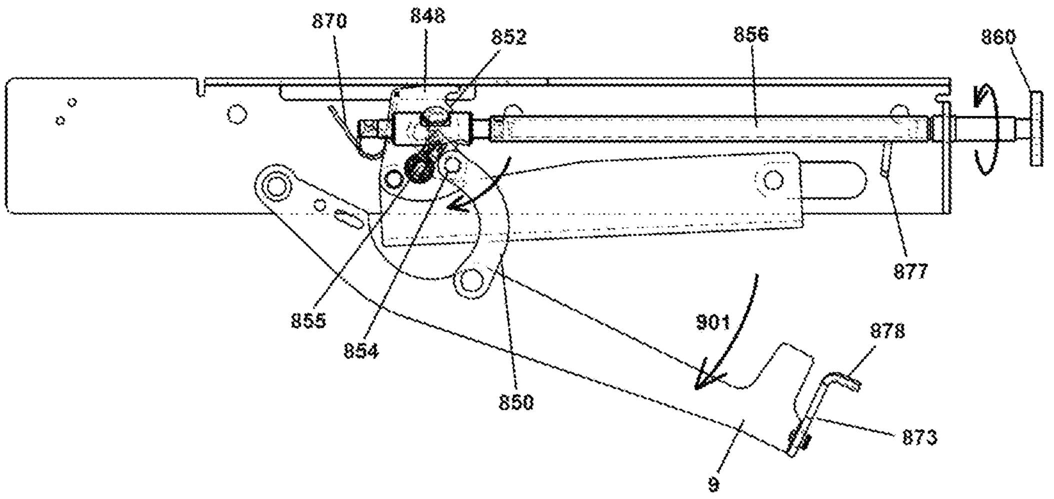
FIG. 53 is a sec-through plan view of the actuation mechanism, illustrating the latching operation via the handle.

When the door 3 is desired to be closed a person grasps the handle 9 and pulls on it as indicated by arrow 901 of FIG. 53. The force of pulling on the handle 9 activates the rod system 901 so as to rotate actuation arm 889. This urges linkage 554 to rotate. However, as seen in FIG. 59, as the pivot 530 is past alignment with the pivot 524 and 558, all rotation of linkage 554 does is to urge the pawl 522 to continue to try to rotate in the anti-clockwise direction, which it is prevented from doing by being blocked by the corner of linkage 554. Accordingly, pulling on the handle 9 does not cause components in the latch 210 to move. Instead, the door 3 is pulled towards to the closed position.

Figure 60:
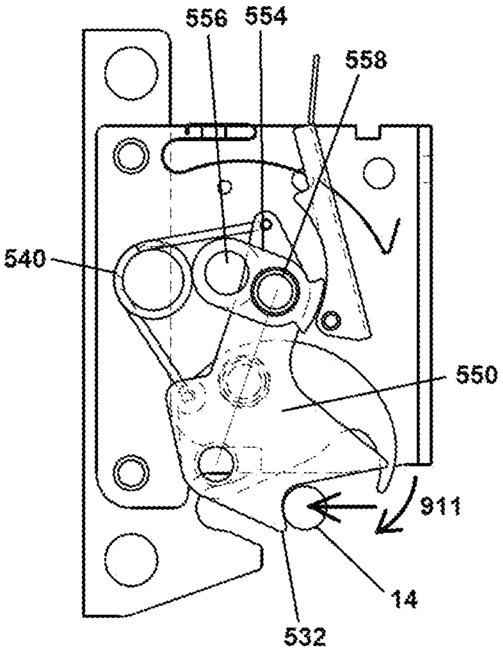
FIG. 60 is a see-through side elevation view of the latch assembly of FIG. 33, in commencement of the latching process.

As the door 3 approaches the closed position, the striker pin 14 will approach the arm 532 of linkage 550. As the pin 14 contacts the arm 532, as seen in FIG. 60, it causes the link 554 to rotate in an anticlockwise direction about pivot 556, which in turn causes the pivot 558 to move to and then past the top dead-centre position. The resilience of the spring 540 must be overcome to do this.

Preferably at this point, but more preferably not before, the door 3 will contact the door seal, which needs to be compressed in order to properly close the door 3.

Now that the linkage 554 is able to move about pivot 556, further pulling on the handle 9 now activates the actuation mechanism 800.

Figure 61:
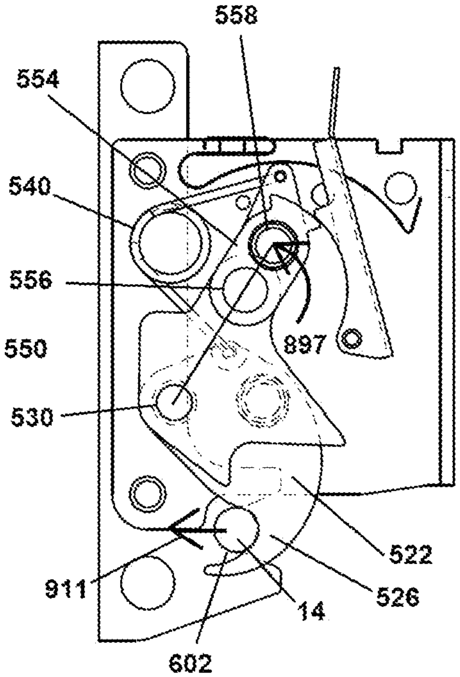
FIG. 61 is a see-through side elevation view of the latch assembly of FIG. 33, in the latching process.

Referring to FIG. 61, rotation of linkage 554 drives the linkage 550, so as to pull on the pivot 530. Pulling on pivot 530 rotates the pawl 522 in a clockwise direction. The arm 526 then contacts the striker pin 14 and forces it to move as indicated by arrow 911 into the recess 602. This forces the door 3 against the seal. This continues until the pin 14 is fully received in the recess 602 by the action of the arm 526, thus compressing the seal.

Figure 62:
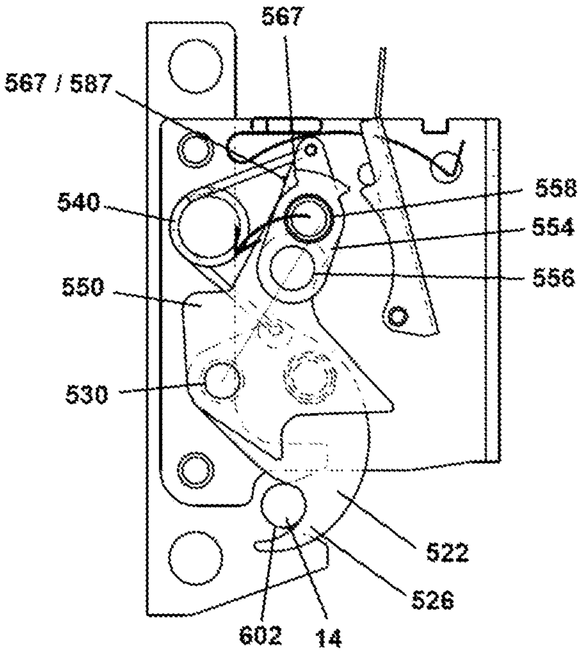
FIG. 62 is a see-through side elevation view of the latch assembly of FIG. 33, in the fully latched position.

At the point shown in FIG. 61, the link 554 is near the latched end of its movement. Further, the pivot 558 is aligned with pivot 556 and pivot 530 in the top dead-centre position. The spring 540 is also compressed at this point. As shown in FIG. 62, the final movement of the link 554 moves the pivot 558 past the top dead-centre position to the over-centre position, so that the latch 210 is in the latched configuration. Spring 540 urges the link 550 away from the pawl 522, ensuring the latch 210 stays in the latched position In the latched position an internal force on the door 3 causes the striker pin 14 to want to pivot the pawl 522 open. Since the latch 210 is in the latched over centre position, the force exerted on the pawl 522 causes the linkage 550 to want to move pivot 558 further over centre, which it cannot do due to the interference between recess 567 and pin 587. Thus, the striker pin 14 is contained within the recess 602. Each latch size may be rated for a given internal and external force against breakage.

FIG. 39 shows the lock 581 moved to a locked position by moving the actuation projection 594 to the down position. In the locked position, the corner 565 is nested in the recess 561 and linkage 554 is prevented from rotation. The latch 210 is now locked in the latched position. When the actuation projection 594 is moved to the up position, the recess 561 will be freed from the corner 565 and linkage 554 will be able to rotate again. The latch 210 will then be unlocked. A ball and spring detent mechanism may act on either side of the lock 581 to keep it in the locked and unlocked position.

Modifications may be made to the present invention within the context of that described and shown in the drawings. Such modifications are intended to form part of the invention described in this specification.

For instance the handle, actuation mechanism and rod system could be replaced with a hydraulic system, comprising a hydraulic door cylinder for opening and closing the door, hydraulically coupled to smaller hydraulic cylinders actuating the latches. The door and latch hydraulic actuators are then directly connected and no additional hydraulic control system is required as sequencing is mechanically controlled as for the handle version.

What is claimed is:

1. A latching mechanism for securing a door mounted to a door frame, the latching mechanism comprising:

a striker pin mounted to the door frame;

a pawl comprising a first arm for holding the striker pin captive when the door is in a closed position and the pawl is in a latching position;

an actuator moveable relative to the door in a first mode of operation and the actuator is suitable for closing the door in a second mode of operation, wherein the actuator is configured to pivot the pawl from an unlatched position to the latching position according to movement of the actuator in the first mode of operation, wherein the actuator is moveable relative to the door in a third mode of operation and the actuator is suitable for opening the door in a fourth mode of operation, wherein the actuator is configured to pivot the pawl from the latching position to the unlatched position according to movement of the actuator in the third mode of operation, wherein the actuator comprises a linkage mechanism comprising at least a first and a second link member, wherein the first link member is pivotally coupled to the pawl; wherein the first link member is pivotally coupled to the second link member;

wherein the linkage mechanism comprises a first set of three pivot points that are able to move to be in a first alignment where the first set of three pivot points are in a straight line and the first set of three pivots points are able to move to be in a first past-alignment arrangement, and wherein the linkage mechanism comprises a second set of three pivot points that are able to move to be in a second alignment where the second set of three pivot points are in a straight line and the second set of three pivots points are able to move to be in a second past-alignment arrangement; wherein the first set of three pivot points and the second set of three pivot points have at least one different pivot point;

wherein the actuator comprises a biasing mechanism for urging the linkage mechanism to remain in the first past-alignment arrangement so as to keep the pawl in the unlatched position until the door is closed, such that the striker pin contacts and moves a component of the actuator or the pawl, so as to overcome a resistance of the biasing mechanism by movement of the actuator in the second mode of operation and to cause the linkage mechanism to no longer remain in the first past-alignment arrangement so as to release the pawl from the unlatched position; and wherein the biasing mechanism is configured to urge the linkage mechanism to remain in the second past-alignment arrangement so as to keep the pawl in the latching position until the resistance of the biasing mechanism is overcome by movement of the actuator in the third mode of operation and causing the linkage mechanism to no longer remain in the second past-alignment arrangement so as to release the pawl from the latching position.

2. The latching mechanism according to claim 1, wherein when the actuator is in the second mode of operation the actuator does not move relative to the door.

3. The latching mechanism according to claim 1, wherein the actuator transitions from the second mode of operation to the first mode of operation when the component of the actuator or pawl is moved by the striker pin.

4. The latching mechanism according to claim 1, wherein movement of the actuator moves the door in a closing direction when the actuator is in the second mode of operation;

wherein movement of the actuator moves the door in an opening direction when the actuator is in the fourth mode of operation;

wherein the movement of the actuator in the first mode of operation is substantially the same type and/or same direction as the movement of the actuator in the second mode of operation; and wherein the movement of the actuator in the third mode of operation is substantially the same type and/or same direction as the movement of the actuator in the fourth mode of operation.

5. The latching mechanism according to claim 4, wherein when the actuator is in the fourth mode of operation the actuator does not move relative to the door.

6. The latching mechanism according to claim 4, wherein the actuator transitions from the third mode of operation to the fourth mode of operation when the pawl is in the unlatched position.

7. The latching mechanism according to claim 4, wherein the actuator is configured such that operation of the actuator so as to overcome the resistance is required/occurs:

(i) before the actuator is operated to open the door; or (ii) before the pawl can unlatch the striker pin.

8. The latching mechanism according to claim 4, wherein the actuator is configured such that operation of the actuator to unlatch the pawl occurs before further operation of the actuator when opening the door.

9. The latching mechanism according to claim 1, wherein the first link member is pivotally coupled to the pawl by a first floating pivot, wherein the pawl is pivotal about a first pivot point fixed relative to the door, wherein the first link member is pivotally coupled to the second link member by a second floating pivot; wherein the second link member is pivotal about a second pivot point fixed relative to the door.

10. The latching mechanism according to claim 9, wherein operation of the actuator in each of the first and third modes of operation causes the second link member to pivot relative to the second point fixed relative to the door in a direction according to which mode of operation the actuator is operated in.

11. The latching mechanism according to claim 9, wherein when the actuator is in the first mode of operation, as the pawl is moved to be in the latching position, the linkage mechanism moves from the first past-alignment arrangement to be in the first alignment and then to a first before-centre arrangement.

12. The latching mechanism according to claim 11, wherein when in the first mode of operation, the linkage mechanism is arranged so that to move the pawl from the unlatched position to the latching position, the second floating pivot and the first floating pivot must move to be in the first alignment with the first point fixed relative to the door, where they are in alignment, and then past the first alignment to the first before center arrangement.

13. The latching mechanism according to claim 12, wherein the latching mechanism comprises a stop for stopping the second link member from moving the second floating pivot further out of alignment in one direction.

14. The latching mechanism according to claim 13, wherein the latching mechanism comprises a stop for stopping the second link member from moving the second floating pivot further out of alignment in an opposite direction.

15. The latching mechanism according to claim 12, wherein when in the third mode of operation, the linkage mechanism is arranged so that to move the pawl from the latching position to the unlatched position, the second floating pivot and the first floating pivot must move to be in the first alignment with the first pivot point fixed relative to the door, where they are in alignment, and then past the first alignment to the first past-alignment arrangement.

16. The latching mechanism according to claim 11, wherein the first past-alignment arrangement of pivot points, the first before-centre arrangement, and the first alignment are of the first floating pivot, the first pivot point fixed relative to the door and the second floating pivot.

17. The latching mechanism according to claim 16, wherein when in the third mode of operation, the linkage mechanism is arranged so that to move the pawl from the latching position to the unlatched position, the second floating pivot, and the first floating pivot must move to be in the first alignment with the first pivot point fixed relative to the door, where they are in alignment, and then past the first alignment to the first past-alignment arrangement.

18. The latching mechanism according to claim 11, wherein the second past-alignment arrangement of pivot points, the second before-centre arrangement, and the second alignment are of first floating pivot, the second pivot point fixed relative to the door and the second floating pivot.

19. The latching mechanism according to claim 18, whereby in the third mode of operation, the linkage mechanism is arranged so that to move the pawl from the latching position to the unlatched position, the second floating pivot, and the first floating pivot must move from the second before-centre arrangement to be in the second alignment with the fixed pivot of the pawl and then past the second alignment to a second over centre position, such that a force on the pawl attempting to move the pawl from the unlatched position is transferred through the linkage mechanism so that the second floating pivot attempts to move further out of alignment with the second alignment.

20. The latching mechanism according to claim 9, wherein when the actuator is in the third mode of operation, as the pawl is moved to the unlatched position, the linkage mechanism moves from a second past-centre arrangement to be in the second alignment and then to the second before-alignment arrangement.

21. The latching mechanism according to claim 9, wherein when the actuator is in the first mode of operation, as the pawl is moved to the latching position, the linkage mechanism moves from a second before-centre arrangement to be in the second alignment and then to the second past-alignment arrangement.

22. The latching mechanism according to claim 9, wherein when the second floating pivot, a fixed pivot of the pawl and the first floating pivot are not aligned and the pawl is positioned to capture the striker pin, the linkage mechanism is in a second past-centre arrangement having moved past being in a straight line.

23. The latching mechanism according to claim 1, wherein the pawl or first link member comprises a protrusion which is configured so that when the pawl moves to release the striker pin, the protrusion ejects the striker pin from being captive.

24. The latching mechanism according to claim 1, wherein the actuator is configured such that operation of the actuator so as to close the door is required before the operation of the actuator overcomes the resistance of the biasing mechanism.

25. The latching mechanism according to claim 1, wherein the actuator is configured such that operation of the actuator so as to overcome the resistance is required before the pawl can latch the striker pin.

26. The latching mechanism according to claim 1, wherein the linkage mechanism is arranged so as to apply a leveraged force to the pawl, wherein the pawl is able to be moved by the actuator so as to push against the striker pin so as to overcome resistance of a door seal when moving the door to the closed position, and wherein the door seal is compressed in a leveraged manner during said moving of the door to the closed position.

27. The latching mechanism according to claim 1, wherein the biasing mechanism comprises a first over-centre mechanism, wherein the first over-centre mechanism urges the actuator to keep the pawl in the latching position, whereby an unlatching force applied to the pawl is arranged to urge the first over-centre mechanism further over-centre.

28. The latching mechanism according to claim 27, wherein unlatching movement of the actuator moves the first over-centre mechanism toward a dead-centre position and then past said dead-centre position.

29. The latching mechanism according to claim 28, wherein the biasing mechanism further comprises a stop for preventing the first over-centre mechanism from further movement over-centre.

30. The latching mechanism according to claim 27, wherein the biasing mechanism comprises a second over-centre mechanism, wherein the second over-centre mechanism urges the actuator to keep the pawl in the unlatched position, whereby a closing action applied to the actuator urges the pawl further in an unlatching direction.

31. The latching mechanism according to claim 30, wherein the biasing mechanism further comprises a stop for preventing the pawl from moving further in the unlatching direction.

32. The latching mechanism according to claim 31, wherein the stop is the second link member.

33. The latching mechanism according to claim 30, wherein the contact by the striker pin against the pawl or the first link member moves the second over-centre mechanism toward and then past over-centre, such that the closing action applied to the actuator urges the pawl in a latching direction.

34. The latching mechanism according to claim 1, wherein the second link member is pivotable in relation to an actuation pin.

35. The latching mechanism according to claim 1, wherein movement of the actuator so as to close the door moves the door to the closed position, and then continued movement of the actuator in substantially the same manner, when the door is closed, causes actuation of the pawl so as to hold the strike pin with the pawl wherein the pawl then latches the door, further movement of the actuator in substantially the same manner causes activation of the biasing mechanism which prevents unlatching of the pawl unless the resistance of the biasing mechanism is overcome by movement of a handle or hydraulic circuit acting on the actuator in a manner that would open the door.

36. The latching mechanism according to claim 1, wherein the biasing mechanism comprises a spring connected to the first link member and to the second link member and is arranged to urge the respective connections to move the spring toward a rest position.

* * * * *